(12) United States Patent
Carter et al.

(10) Patent No.: US 10,737,563 B2
(45) Date of Patent: Aug. 11, 2020

(54) BIAS REGULATED ROLLING TRUCK BED COVER

(71) Applicant: Tectum Holdings Inc., Ann Arbor, MI (US)

(72) Inventors: Chad Carter, Manchester, MI (US); Ryan DeLong, Stockbridge, MI (US); Jerome Facchinello, Grand Blanc, MI (US); William Cohoon, Whitmore Lake, MI (US); Robert Gaarder, West Bloomfield, MI (US); Wilbur Paul Winkle, III, Ypsilanti, MI (US)

(73) Assignee: Tectum Holdings Inc., Ann Arbor, MI (US)

( * ) Notice: Subject to any disclaimer, the term of this patent is extended or adjusted under 35 U.S.C. 154(b) by 246 days.

(21) Appl. No.: 15/940,502

(22) Filed: Mar. 29, 2018

(65) Prior Publication Data
US 2019/0210437 A1     Jul. 11, 2019

Related U.S. Application Data

(60) Provisional application No. 62/615,278, filed on Jan. 9, 2018.

(51) Int. Cl.
*B60J 7/06* (2006.01)
*B60P 7/04* (2006.01)

(52) U.S. Cl.
CPC .............. *B60J 7/068* (2013.01); *B60P 7/04* (2013.01)

(58) Field of Classification Search
CPC .................................... B60J 7/068; B60P 7/04
USPC ......................................................... 296/98
See application file for complete search history.

(56) References Cited

U.S. PATENT DOCUMENTS

| | | | | |
|---|---|---|---|---|
| 2,594,597 A | * | 4/1952 | Taylor | B60J 7/068 296/100.15 |
| 2,898,607 A | | 8/1959 | McGuire | |
| 2,967,733 A | * | 1/1961 | Amerine | B60J 7/068 296/98 |
| 2,997,967 A | * | 8/1961 | Malapert | B61D 39/006 105/377.02 |
| 3,146,824 A | | 9/1964 | Veileux | |
| 3,292,971 A | * | 12/1966 | Zucker | B60P 3/343 296/99.1 |

(Continued)

OTHER PUBLICATIONS

Canadian First Office Action for Application 3,025,599; dated Oct. 18, 2019.

(Continued)

*Primary Examiner* — Hilary L Gutman
(74) *Attorney, Agent, or Firm* — The Dobrusin Law Firm, P.C.

(57) ABSTRACT

A tonneau system comprising: (a) a plurality of tonneau sections; (b) a retraction system including: (i) a drive roller; (ii) a pulley spaced apart from the drive roller; (iii) a track extending from a location proximate to the drive roller to a location proximate to the pulley; and (iv) a line connected to the drive roller and one or more of the plurality of tonneau sections; wherein the line extends between the one or more of the plurality of tonneau sections and the driver roller when the plurality of tonneau sections are in the closed position, and the line extends from the one or more of the plurality of tonneau sections around the pulley and to the drive roller when the plurality of tonneau sections are in the stored position.

15 Claims, 21 Drawing Sheets

(56) References Cited

U.S. PATENT DOCUMENTS

| | | | |
|---|---|---|---|
| 3,467,431 A | 9/1969 | Turncotte | |
| 3,768,540 A | 10/1973 | McSwain | |
| 3,774,958 A | 11/1973 | Thorpe | |
| 3,854,770 A | 12/1974 | Grise et al. | |
| 4,138,154 A * | 2/1979 | McKeon | B60J 7/068 |
| | | | 296/98 |
| 4,157,202 A | 6/1979 | Bachand | |
| 4,341,419 A | 7/1982 | Richard | |
| 4,516,802 A | 5/1985 | Compton | |
| 4,563,034 A | 1/1986 | Lamb | |
| 4,717,196 A * | 1/1988 | Adams | B60J 5/14 |
| | | | 160/201 |
| 4,784,427 A * | 11/1988 | Burgess | B60J 7/068 |
| | | | 160/314 |
| 4,786,099 A | 11/1988 | Mount | |
| 4,792,178 A | 12/1988 | Kokx | |
| 4,882,806 A | 11/1989 | Davis | |
| 4,889,381 A | 12/1989 | Tamblyn et al. | |
| 4,909,563 A * | 3/1990 | Smith | B60J 7/062 |
| | | | 160/264 |
| 5,184,864 A | 2/1993 | Teignen et al. | |
| 5,205,605 A * | 4/1993 | Haddad, Jr. | B60J 7/085 |
| | | | 242/397 |
| 5,251,950 A | 10/1993 | Bernardo | |
| 5,758,921 A | 7/1998 | Hall | |
| 5,887,937 A | 3/1999 | Searfoss | |
| 5,921,603 A | 7/1999 | Karrer | |
| 6,053,556 A | 4/2000 | Webb | |
| 6,276,735 B1 | 8/2001 | Champion | |
| 6,848,734 B1 * | 2/2005 | Mulvaney | B60J 7/085 |
| | | | 160/133 |
| 6,893,071 B2 | 5/2005 | Chabot | |
| 7,252,322 B2 | 8/2007 | Rusu | |
| 7,404,586 B2 | 7/2008 | Seilberling | |
| 7,537,264 B2 | 5/2009 | Maimin et al. | |
| 8,862,815 B2 | 10/2014 | Jansen et al. | |
| 9,399,390 B1 | 7/2016 | Shortz | |
| 9,688,127 B2 | 6/2017 | Hemphil et al. | |
| 9,834,076 B2 * | 12/2017 | Rohr | B60J 7/067 |
| 9,889,789 B2 | 2/2018 | Beltowski et al. | |
| 2003/0173795 A1 * | 9/2003 | Dumas | B60J 7/068 |
| | | | 296/98 |
| 2014/0312645 A1 | 10/2014 | Maimin | |
| 2016/0236552 A1 * | 8/2016 | Hannan | B60J 7/068 |
| 2017/0259652 A1 * | 9/2017 | Cramaro | B60J 7/062 |
| 2017/0341494 A1 * | 11/2017 | Hannan | B60J 7/068 |

OTHER PUBLICATIONS

DDM Garage Doors, How to Replace Garage Door Torsion Springs (last accessed Jul. 18, 2017).

* cited by examiner

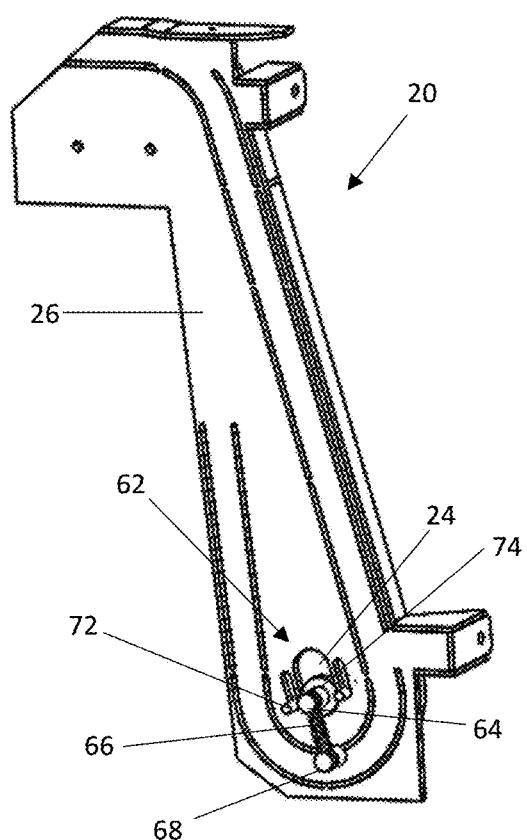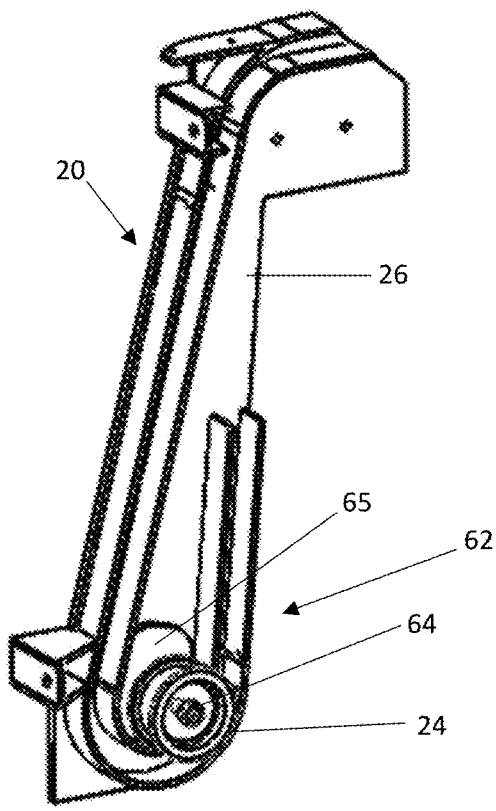
Fig. 7  Fig. 8
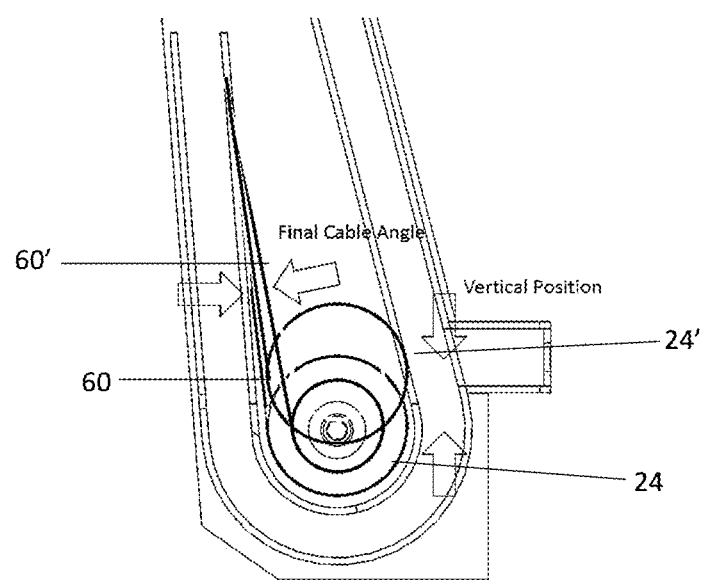
Fig. 9

BIAS REGULATED ROLLING TRUCK BED COVER

FIELD

The present teachings relate to a truck bed cover that is a hinged tonneau system with a plurality of tonneau sections that are foldable relative to each other and specifically a truck bed cover that is connected to a cable, which regulates movement of the truck bed cover between an open position and a closed position.

BACKGROUND

Tonneau systems cover an open area of a vehicle and generally cover an open area of a pick-up truck (i.e., a bed). Multiple different types of tonneau systems are available, with some of the tonneau covers being solid and opening about a pivot, some folding upon themselves, and others rolling up. With the roll up type covers, as the cover begins to roll up an amount of force required to store the cover gradually decreases. In some instances, the cover may begin to extend to a storage position and the user may have to resist movement of the tonneau cover towards the storage position. Conversely, upon removal of the cover from the storage position, the user may have to exert a large amount of force and as the tonneau cover deploys an amount of force may gradually decrease. Further, in moving between a stored position and a deployed position the tonneau cover may not be fully supported by a portion that covers a tail gate and thus the tonneau cover may sag. A sag in the cover may require user assistance to guide the tonneau into a closed position. Finally, the tonneau covers, in a closed position, may prevent water from entering the bed of a vehicle. When water and debris land upon the tonneau cover, the water may pool upon the cover so that upon opening the cover some of the water may enter the bed of the vehicle.

Examples of tonneau systems are found in U.S. Pat. Nos. 4,889,381; 4,563,034; 4,786,099; 4,792,178; 5,251,950; all of which are expressly incorporated herein by reference for all purposes. It would be desirable to have a retraction system that both assists in storing a tonneau cover and deploying a tonneau cover. What is needed is a retraction system that maintains a substantially constant amount of force upon an entire closing movement, an entire opening movement, or both. It would be desirable to have one or more pulleys that adjust upon travel of the tonneau cover within a canister that stores the tonneau cover. What is needed is a connection system with one or more connectors that connect a tonneau cap to one or more tonneau sections. It would be desirable to have one or more tail supports that assist the tonneau cap with forming a connection with an end of a bed or a tailgate of a bed without needing user assistance to extend the tonneau cap over the end or tailgate. What is needed is a tonneau system with a plurality of drain features that assist in removing water from the tonneau system so that the bed remains dry.

SUMMARY

The present teachings seek to help solve one or more of the problems/issues disclosed above. The present teachings are particularly directed to regulating movement of the truck bed cover into and out of a canister of the tonneau system.

Accordingly, pursuant to one aspect of the present teachings provide: a tonneau system comprising: (a) a plurality of tonneau sections; (b) a retraction system including: (i) a drive roller; (ii) a pulley spaced apart from the drive roller; (iii) a track extending from a location proximate to the drive roller to a location proximate to the pulley; and (iv) a line connected to the drive roller and one or more of the plurality of tonneau sections; wherein the line extends between the one or more of the plurality of tonneau sections and the driver roller when the plurality of tonneau sections are in the closed position, and the line extends from the one or more of the plurality of tonneau sections around the pulley and to the drive roller when the plurality of tonneau sections are in the stored position.

The present teachings provide: a tonneau system comprising: (a) a plurality of tonneau sections: (b) a retraction system including: (i) an adjuster shaft; (ii) one or more bias members connected to the adjuster shaft, the drive roller, or both; (iii) one or more drive rollers in communication with the adjuster shaft; (iv) one or more lines connected to one or more of the plurality of tonneau sections and connected to the drive roller; (v) a support bracket; (vi) a clamp connected to the support bracket, the support bracket preventing movement of the clamp; and an adjuster in communication with the clamp so that the clamp prevents movement of the adjuster.

The present teachings provide: a method comprising: a tonneau system comprising: (a) a retraction system including: (i) a track; (b) a tonneau cover including: (i) a plurality of tonneau sections including: (1) one or more latch bar connectors including one or more male latch connectors, one or more female latch connectors, or both; (ii) a tonneau cap including; (1) one or more tail connectors including one or more male connectors, one or more female connectors, or both; wherein the one or more tail connectors of the tonneau cap connect to the one or more latch bar connectors of the plurality of tonneau sections so that the tonneau cap is connected to and extends from the plurality of tonneau sections, and wherein the retraction system moves the tonneau cover between a closed position and a stored position, where the tonneau cap extends beyond the track of the retraction system when the tonneau cover is in the closed position and the connection between the one or more latch bar connectors and the one or more tail connectors support the tonneau cap.

The present teachings provide: a tonneau system comprising: (a) a tonneau cover including: (i) a plurality of tonneau sections including: (1) a plurality of rollers; (ii) a tonneau cap connected one of the plurality of tonneau sections; (b) a retraction system including: (i) one or more tracks; (c) one or more tail supports; wherein the tonneau cap extends beyond the one or more tracks when the tonneau cover is in a closed position, and the tonneau cap is prevented from sagging by the one or more tail supports.

The present teachings provide: a tonneau system comprising: (a) a tonneau cover having a first side with a plurality of rollers and a second side with a plurality of rollers; (b) one or more tracks on the first side; (c) one or more tracks on the second side; wherein the one or more tracks on the first side and the one or more tracks on the second side include a plurality of drain channels.

The present teachings provide: a tonneau system comprising: (a) a tonneau cover configured to extend along a bed of a vehicle, the tonneau cover having a first end and a second end; (b) a canister located at the first end of the tonneau cover, the canister including: (i) a track including a plurality of tracks that receive the tonneau cover so that the tonneau cover rolls up within the plurality of tracks when the tonneau cover is in a stored position; and (ii) a retraction system including: (1) a drive roller; (2) one or more lines extending from the drive roller to the second end of the tonneau cover; and (3) a bias member that assists in moving the drive roller so that the one or more lines assist in moving the tonneau cover from a closed position to the stored position.

The present teachings may include one or more of the following: wherein the tonneau cover extends cantilever from the plurality of tonneau sections when the tonneau cover is in the closed position; wherein the one or more latch bar connectors include the one or more female latch connectors and the one or more tail connectors include the one or more male connectors that extend into the one or more female latch connectors; wherein the one or more tail connectors include the one or more female connectors and the one or more latch bar connectors include the one or more male latch connectors that extend into the one or more female connectors; wherein the one or more tail connectors include one of the one or more female connectors and one of the one or more male connectors and the one or more latch bar connectors include one of the one or more female latch connectors and one of the one or more male latch bar connectors, and the one of the one or more male latch connectors extend into the one of the one or more female connectors and the one of the one or more male connectors extend into the one of the one or more female latch connectors; wherein the male connector and the female connector extend at an angle relative to each other of between about 60 degrees and about 105 degrees; wherein the male latch connector and the female latch connector extend at an angle relative to each other of between about 60 degrees and about 105 degrees; wherein the tail connector includes one or more lock connectors and the latch bar connector includes one or more lock latch connectors that receive the one or more lock connectors to assist in connecting the tail connector to the latch bar connector; wherein the lock connector extends into the lock latch connector and has a curved portion; wherein the one or more male latch connectors, the one or more male connectors, or both include a bulbous portion that prevents the one or more male latch connector from being removed from the one or more female connectors, the one or more male connectors from being removed from the one or more female latch connectors, or both; wherein the tail connector, the latch bar connector, or both are made of or include aluminum, a thermoset, a stamped metal piece, or a combination thereof; or a combination thereof.

The present teachings may provide one or more of the following: wherein the one or more tail supports are one or more ramps or one or more steps that support one or more of the plurality of rollers; wherein the one or more tail supports are located within or are part of the one or more tracks; wherein the one or more tail supports are one or more of the plurality of rollers off set from a remainder of the plurality of rollers so that the one or more of the plurality of rollers are located in a second plane that is offset from a first plane that the remainder of the plurality of rollers extend within; wherein the one or more tail supports move one or more of the plurality of rollers from a first plane to a second plane so that the tonneau cap is capable of extending over a wall of a truck bed; wherein the tonneau cap extends over the wall of the truck bed without user interaction; wherein the one or more tail supports shift one or more of the plurality of rollers from a first plane at a bottom of the one or more tracks to a second plane at a top of the one or more tracks so that the tonneau cap is supported as the tonneau cap extends cantilever from the one or more track; or a combination thereof.

The present teachings may provide one or more of the following: wherein the plurality of rollers of the first side extend into the one or more tracks on the first side and the plurality of rollers on the second side extend into the one or more tracks on the second side and the plurality of rollers contact a top of one or more of the plurality of drain channels so that the plurality of rollers are free of contact with liquids located within the drain channels; wherein each of the one or more tracks on the first side, each of the one or more tracks on the second side, or both include one or more rail end caps; wherein the one or more rail end caps each include one or more drain holes; wherein the plurality of drain channels are in fluid communication with one or more drain tubes that guide fluid from the drain channels to a location external of a bed of a vehicle; wherein the plurality of drain channels are in fluid communication with the one or more drain holes and the one or more drain holes guide fluid from the drain channels to a location external of a bed of a vehicle; or a combination thereof.

The present teachings provide one or more of the following: wherein the retraction system is located outside of the track and an axis of the retraction system extends substantially parallel to an axis of the track; wherein the bias member is a spring; wherein a first end and a second end of the drive roller include one or more bearings; wherein a first end, a second end, or both of the drive roller includes one or more pulleys that connect the one or more lines to the drive roller; wherein the bias member is in communication with a tensioner that assists the bias member in storing energy; wherein the one or more lines extend along all or a portion of an upper surface, a lower surface, or both of the tonneau cover; wherein the one or more lines extend through a line rail grommet that assists in maintaining the one or more lines substantially linear during retraction or deployment of the tonneau cover; wherein the tonneau cover extends along one or more underbody rails and the line rail grommet is connected to the one or more underbody rails; wherein the canister includes a canister cover and the drive roller is connected to the canister cover via an end plate at a first end of the drive roller and an end plate at the second end of the drive roller; wherein the one or more tracks are a plurality of tracks that are concentric; wherein the one or more tracks are a plurality of tracks that are formed by a linear spiral; wherein the one or more tracks are a plurality of tracks that are non-concentric, a waterfall, oval, elliptical, or a combination thereof; wherein the canister includes a canister cover at a first end and a canister cover at a second end and the canister cover at the first end and the canister cover at the second end each include the one or more tracks that are a plurality of tracks with a middle region of the canister being free of the track cover; wherein the tonneau cover includes a plurality of cover sections connected together by a plurality of hinges; or a combination thereof.

The present teachings provide one or more of the following: wherein the one or more drive gears are in direct communication with the tonneau cover; wherein the tonneau cover includes a plurality of rollers and the one or more drive gears are in communication with the plurality of rollers to move the tonneau cover; wherein the one or more drive gears have a body and a plurality of teeth; wherein the plurality of teeth are in direct communication with the tonneau cover or one or more rollers in communication with the tonneau cover; or a combination thereof.

The present teachings provide a retraction system that both assist in storing a tonneau cover and deploying a tonneau cover. The present teachings provide a retraction system that maintains a substantially constant amount of force upon an entire closing movement, an entire opening movement, or both. The present teachings provide one or more pulleys that adjust upon travel of the tonneau cover within a canister that stores the tonneau cover. The present teachings provide a connection system with one or more connectors that connect a tonneau cap to one or more tonneau sections. The present teachings provide have one or more tail supports that assist the tonneau cap with forming a connection with an end of a bed or a tailgate of a bed without needing user assistance to extend the tonneau cap over the end or tailgate. The present teachings provide a tonneau system with a plurality of drain features that assist in removing water from the tonneau system so that the bed remains dry.

BRIEF DESCRIPTION OF THE DRAWINGS

FIG. 7 is an outside view of a canister;

FIG. 8 is an inside view of a canister;

FIG. 9 illustrates movement of pulley as the tonneau cover moves around the pulley;

DETAILED DESCRIPTION

Figure 1A:
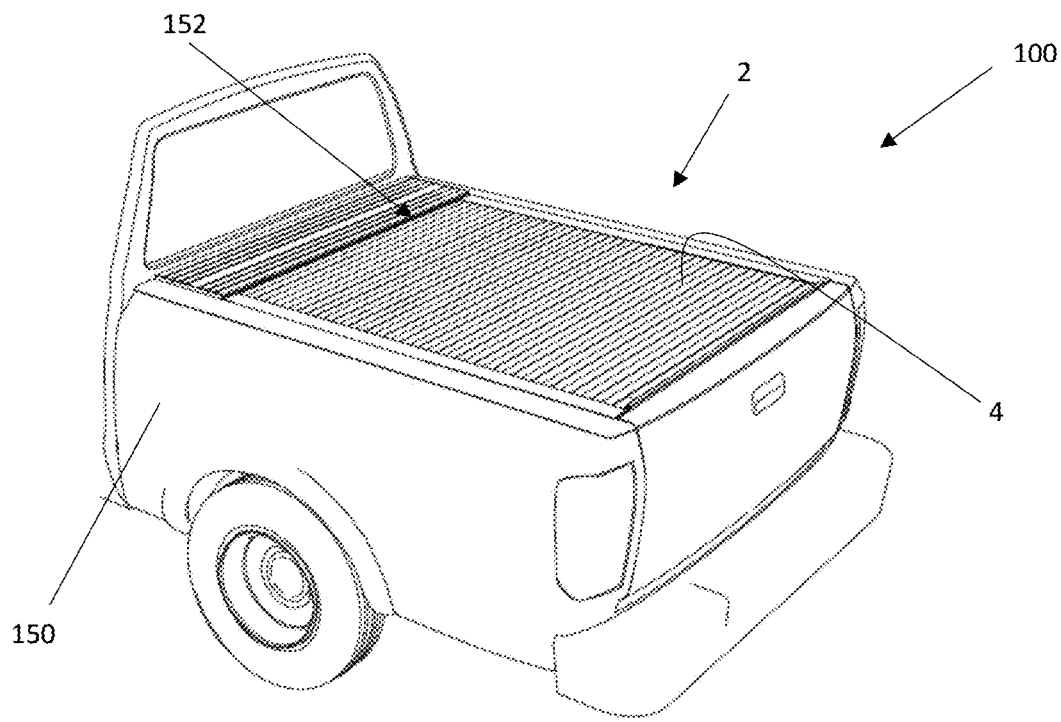
FIG. 1A is a perspective view of a vehicle with a tonneau system in a closed position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The foldable tonneau system (tonneau system) functions to cover an open area and prevent fluid, debris, dirt, or a combination thereof form entering the open area (e.g., a bed of a pick-up truck, and hereinafter "bed"). The tonneau system may function to lock a bed so that items may be stored within the bed. The tonneau system may be collapsible so that items may be placed within the bed without interference from the tonneau system. The tonneau system may fold upon itself to expose the bed. The tonneau cover may roll up or roll into a canister that stores the tonneau cover of the tonneau system. The tonneau system may include one or more tonneau sections and preferably a plurality of tonneau sections.

The tonneau sections (i.e., section) function to connect together to create one contiguous surface. The tonneau sections may lock together. The tonneau sections may be longitudinally movable, rotationally movable, or both relative to other tonneau sections. The tonneau sections when in a closed position may prevent fluid, debris, dirt, or a combination thereof from entering a bed. The tonneau sections may be separate pieces. The one or more tonneau sections may be connected together to extend within a first plane. The one or more tonneau sections may extend along a first plane when the tonneau sections are in a closed position. The one or more tonneau sections may extend from the first plane and into the canister when the tonneau sections are moved into the stored position. The one or more tonneau sections may extend in a first plane and the line may extend in a second plane that is substantially parallel to the first plane. The tonneau sections may be connected together by a hinge, an outer covering, or both. The tonneau sections may be connected together by a cover that is flexible so that one tonneau section is movable relative to another tonneau section. The tonneau sections may be a plurality of sections that are flexible so that the tonneau sections may mirror the shape of the track. The tonneau sections may include one or more inner sections, one or more outer sections, one or more curved sections, or a combination thereof. The one or more inner sections may be a plurality of sections. The inner sections may be a forward end of the tonneau cover and may extend into the canister first. The inner sections may extend into the canister first. The inner sections may be connected to one or more lines. The inner sections may be connected to one or more curved sections. The curved sections may change the tonneau cover from a first direction to a second direction. The curved sections may be flat in the closed position. The curved sections may be arcuate or bent in the stored position. The curved sections may assist the tonneau cover in confirming to the shape of the track. The tonneau cover may only be made of curved sections. The curved sections may be located between one or more inner sections and one or more outer sections. The one or more outer sections may be the last sections to extend into the canister. The one or more outer sections may remain partly out of the canister. The one or more outer sections may connect to a tonneau cap, an end of a bed, a tailgate, or a combination thereof. The one or more outer sections may be a portion that a user grips to remove the tonneau cover from the canister. The tonneau sections when connected together may form a tonneau cover, which covers a bed of a vehicle.

The outer covering may be flexible so that one tonneau section may be moved relative to another tonneau section. The outer covering may prevent one tonneau section from being longitudinally moved relative to another tonneau section. The tonneau sections may include a frame member (e.g., including support arms, support brackets, mounting parts, tracks, or a combination thereof). The tonneau sections may include one or more frame members. The one or more frame members may extend along a length of each section, form a perimeter of the foldable tonneau system, or both. The tonneau sections may be made of a sheet moulding compound. The tonneau sections may be made of a polymer, foam, metal, aluminum, titanium, or a combination thereof. The outer covering may have some elastomeric properties that allow one tonneau section to be longitudinally moved relative to another tonneau section. The outer covering may be a spacer that is located between each tonneau section and moves with each tonneau section. The outer covering may prevent water from penetrating between the tonneau sections in the closed position, extended position, stored position, or a combination thereof. The cover may extend over more than one tonneau section. The cover may extend from one end of a tonneau section to another end of a tonneau section so that a gap between the tonneau sections are covered. The tonneau sections may be free of an outer covering. The tonneau sections may be rotatable about a hinge pivot.

The one or more hinges may function to allow angular movement of one section relative to another section. The one or more hinges may permit the tonneau cover to roll up (i.e., form a plurality of connected circular shapes with an increasing radius). The one or more hinges may permit the tonneau cover to bend so that one section of the tonneau cover extends parallel to another section or converges towards the section. The one or more hinges may lock the sections together when the tonneau cover is in the closed position. The one or more hinges may permit rotational movement as the tonneau cover moves towards and into the stored position. The one or more hinges may allow the tonneau sections to rotate relative to each other from a first plane to an angle relative to each other. The one or more hinges may allow the tonneau sections to rotate an angle of about 5 degrees or more, about 10 degrees or more, about 15 degrees or more, or about 25 degrees or more. The one or more hinges may allow the tonneau sections to rotate at an able of about 90 degrees or less, about 60 degrees or less, about 45 degrees or less, or about 30 degrees or less. The one or more hinges may be located along a width, at the ends, in a middle region, or a combination thereof of each of the sections being connected together. The one or more hinges may connect two or more hinge sections along a hinge axis.

The one or more hinge axes may be a line that two or more tonneau sections rotate about relative to each other. Each hinge section may include a hinge axis on a first side and a second side. The hinge axes include one or more pins that extend through one or more connection arms through each of the tonneau sections. The hinge axis may extend transverse to a direction of movement of the tonneau cover. The hinge axis may extend perpendicular to a direction of movement of the tonneau cover. One or more of the tonneau sections when connected together along the one or more hinge axes may include one or more seals.

The one or more seals may function to prevent fluid or debris from entering the tonneau system at a front end, rear end, passenger side, driver side, between the sections, or a combination thereof. The one or more seals may prevent fluid from extending into the tracks, the canister, or both. The one or more seals may be made of rubber, an elastomeric material, or both. The one or more seals may extend cantilever from one or more sections of the tonneau cover. The one or more seals may contact a drive roller when the tonneau cover is in the closed position. The one or more seals may extend along the one or more hinges and move fluid from a central region into drain channels in the roller track. The one or more seals may guide fluid to drain channels, drain tubes, drain holes, or a combination thereof. The one or more seals may seal a connection between a tonneau section and a tonneau cap, assist in connecting the tonneau section to the tonneau cap, or both.

The tonneau cap may function to close and end of the tonneau cover; form an interface between a tail gate, an end of a bed, or both of a vehicle bed; seal a rear of a bed; lock a tonneau cover to a tail gate, an end of a bed, or both; or a combination thereof. The tonneau cap may extend from a tonneau section. The tonneau cap may extend cantilever from one or more sections. The tonneau cap may form an end of the tonneau cover. The tonneau cap may extend beyond the rail cap, roller track, track, or a combination thereof. In the closed position, the tonneau cap may only contact one section and the end of a bed or a tail gate of the bed. The tonneau cap may mirror the shape of a rear of the bed. The tonneau cap may be square, have rounded corners, have a middle section that projects beyond edge regions, or a combination thereof. The tonneau cap may be made of the same materials as the tonneau sections. The tonneau cap may have a length (i.e., when measured in the direction of the vehicle) that is about the same size as the sections, about 1.5 times as long or more, about 2 times or more, or even about 3 times or more as long as the sections. The tonneau cap may be connected to the tonneau sections by one or more connectors.

The one or more connectors function to connect the tonneau cap to one or more sections. The one or more connectors function to support a tonneau cap when the tonneau cap extends cantilever from one or more sections of the tonneau cover. The one or more connectors may form a seal between the one or more sections and the tonneau cap. The one or more connectors may prevent sagging of the tonneau cap when the tonneau cap extends out of or past the track, the roller track, the rail cap, or a combination thereof. The one or more connectors may include a portion within a tonneau cap (i.e., a tail connector) and a portion within a tonneau section (i.e., a latch bar connector).

The one or more tail connectors may function to connect to or be part of a tonneau cap. The one or more tail connectors may function to connect a tonneau cap to one or more sections of a tonneau cover. The one or more latch bar connectors may function to connect to or be part of a tonneau section. The one or more latch bar connectors may function to connect a tonneau section to a tonneau cap. The one or more latch bar connectors may function to connect to a tail connector. The tail connector and the latch bar connector may be complementary in shape and size. A thickness of the tail connector and the latch bar connector may be substantially the same. The latch bar connector may have a portion that extends along a thickness of the section, the tonneau cap, or both. The latch bar connector may have an elongated portion that forms an interface between the tonneau cap and the tonneau section. The latch bar connector may have a portion that is contacted by the tail connector or the tonneau cap and the portion may support the tonneau cap when the tonneau cap extends cantilever from the tonneau section. The one or more tail connectors, latch bar connectors, or both may form a flexible connection. The one or more tail connectors, latch bar connectors, or both may create a rigid connection. The one or more tail connectors, latch bar connectors, or both may support the tonneau cap when the tonneau cap extends cantilever from one or more sections. The one or more tail connectors, latch bar connectors, or both may include one or more male connectors, one or more female connectors, one or more male latch connectors, one or more female latch connectors or both. Preferably, the tail connectors include the female connectors, the male connectors, or both and the latch bar connectors include the male latch connectors, the female latch connectors, or both. The one or more tail connectors may include two or more male connectors, two or more female connectors, no male connectors, no female connectors, or a combination thereof. Preferably, the tail connector includes one male connector and one female connector. The one or more latch bar connectors may include two or more male latch connectors, two or more female latch connectors, no male latch connectors, no female latch connectors, of a combination thereof. Preferably, the latch bar connector includes one male latch connectors and one female latch connectors. When more than one connector (whether being a male connector (male latch connector) or a female connector (female latch connector)) (e.g., a first connector and a second connector) is present the connectors may be parallel, perpendicular, extend at an angle relative to each other, or a combination thereof. The angle between the first connector and the second connector may be about 45 degrees or more, about 60 degrees or more, or about 75 degrees or more. The angle between the first connector and the second connector may be about 135 degrees or less, about 115 degrees or less, or about 105 degrees or less (e.g., about 90 degrees). For example, a first connector (e.g., a female connector, female latch connector) may extend parallel to the tonneau cover, and a second connector (e.g., a male connector, male latch connector) may extend perpendicular to the tonneau cover.

The male parts as discussed herein may be the male connector, the male latch connector, or both. The one or more male connectors, male latch connectors, or both may extend outward from the tonneau cap, the tail connector, the tonneau section, or a combination thereof. The male connectors and the male latch connectors may have a different size and shape. Preferably, the male connectors and the male latch connectors have a near identical size and shape. The male connectors and the male latch connectors are referred to herein as the male part. The one or more male parts may extend into one or more female parts (e.g., female connector or female latch connector). The one or more male parts and the one or more female parts may form a fixed connection, form an interference fit, or both. The one or more male parts may be rigid. The one or more male parts may be flexible. The one or more male parts, female parts, or both may be flexible to form a connection with a respective female part, male part, or both and then hardened after the connection is formed. An adhesive or mechanical fastener may fixedly connect a male part and a female part together. The male part may have a bulbous portion. The male part may have a portion that is spherically shaped. The male part may have a portion that permits movement in a first direction and prevents movement in a second opposite direction. The male parts may be one continuous part that extends from a first side of a tonneau cover to a second side of a tonneau cover. The male parts may be located in one or more regions, two or more, regions, three or more regions, or even four or more regions along a width of the tonneau cover (e.g., from a driver side to a passenger side). A plurality of male parts may extend from a first side to a second side. The male parts may have a cross-sectional shape that is round, bulbous, a neck region connected to a round region, or a combination thereof. The male parts may support the tonneau cap so that the tonneau cap and the tonneau sections extend substantially within the same plane (i.e., within about ±1 degree of each other). The male part may not be removed from the female part once a connection is formed. Preferably, the male part of the tail connector connects to a female part of a latch bar connector and the male part of the latch bar connector connects to the female part of the latch bar connector.

The female parts as discussed herein may be the female connector, the female latch connector, or both. The female parts function to receive a male part to form a connection. The female parts function to assist in connecting the tonneau cap to one or more tonneau sections. The female part once connected to a male part may form a rigid connection. The female part may assist in supporting the tonneau cap as the tonneau cap extends cantilever. The female part may assist in forming a locked connection with a male part. The female part may be flexible and once a connection is formed with a male part, the female part may harden to prevent removal of the male part. The female part be complementary in shape to a male part. The female part may have a narrow region that grips a neck of a male part. The female part may have internal locking portions that allow a male part to extend into the male part but prevent the male part from being removed in an opposing direction. The female part may be about 90 degrees (i.e., ±3 degrees) from a male part so that movement parallel to the female part is restricted by the male part and vice versa. In addition to the female parts and the male parts the tail connector, the latch bar connector, or both may include one or more lock connectors, one or more lock latch connectors, or both.

The lock latch connector and the latch connector function to prevent disconnection of the tail connector and the latch bar connector. The lock latch connector and the latch connector may extend parallel to one or more male parts, one or more female parts, or both. The lock latch connector and the latch connector may extend perpendicular to one or more male parts, one or more female parts, or both. Preferably, the lock latch connector and the latch connector extend parallel to one or more male parts and one or more female parts and perpendicular to one or more male parts and one or more female parts. The lock latch connector and the latch connector may have a portion that extends parallel to one female part and one male part and a portion that extends perpendicular to one male part and one female part. The lock latch connector and the latch connector may prevent removal of a male part and a female part in both a first and second direction. For example, the lock latch connector and latch connector may have a portion that extends in a first direction and then turns to a second portion that extends in a second direction, thus, upon movement in the first direction, second portion of the lock connector contacts the lock latch connector and restricts the movement and upon movement in the second direction, the first portion of the lock connector contacts a first portion of the lock latch connector to restricts movement. The lock latch connector and the latch connector may be located above a male part, a female part of both. The lock connector may be part of the tail connector. The lock latch connector may be part of the latch bar connector. The lock latch connector may assist is supporting the tonneau cap cantilever. The lock latch connector may work with one or more tail supports, one or more lock mechanism, one or more rollers, or a combination in supporting a tonneau cap.

The lock mechanism may function to lock the tonneau cover, the tonneau cap, or both to a tail gate, an end of a bed, a side of a bed, or a combination thereof. The lock mechanism may extend from a top of a tonneau cover and from a bottom of a tonneau cover. The lock mechanism may be rotated with a key. The lock mechanism may hook a portion of a vehicle to prevent movement of the tonneau cover. The lock mechanism may prevent sliding of the tonneau cover along the rollers of the tonneau cover during movement of the vehicle.

The one or more rollers may function to move the tonneau cover or create a low friction interface for the tonneau cover to move between a closed position and a stored position. Preferably, the rollers discussed herein are sets of opposing rollers. The one or more rollers may function to move the tonneau cover along one or more tracks. The rollers may be part of the cover. The rollers may be part of the track. Each section may have one or more rollers at a first end (e.g., passenger's side) and a second end (driver side). Each section may have a plurality of rollers at each end. The rollers may be located within a plane and may assist the tonneau cover in moving. The rollers may be circular and may create a low-friction surface that the tonneau cover slides along. The rollers may sit within a track that guides the tonneau cover. All of the rollers may be located within a single plane, but one or more sets of rollers or two or more sets of rollers located on the tonneau cap may be offset rollers that are located within a second plane.

The one or more offset rollers may function to extend a tonneau cap out of a plane of the other rollers, the track, the tonneau sections, or a combination thereof. A tail support may be the one or more offset rollers. The one or more offset rollers may extend the tonneau cap out of the plane of the tonneau sections so that when the tonneau cap extends beyond the track the tonneau cap extends over a tailgate, end of a bed, or both. The one or more offset rollers may lift the tonneau cap so that the tonneau cap when unsupported and extending cantilever extends above an end of the bed, a tailgate of the bed, or both. The one or more offset rollers may be offset an entire length of a track. The one or more offset rollers may become offset as the offset roller approaches an end of the track. The offset roller may extend out of a track and lift the tonneau cap, the tonneau sections, or both at a rear end of a track. The offset roller may be free of extension into a canister. The offset roller may prevent the tonneau cap from extending into the canister. The one or more offset rollers may be located within a plane and then as the offset roller approaches an end of the roller track the offset roller may extend down into a recess, lift the tonneau section, lift the tonneau cap, or both. The offset roller may have an arm that pivots and lifts the tonneau sections. The offset roller may contact a stop (e.g., rail end cap) and upon contact with the stop, rail end cap, or both may have a pivot that moves the tonneau sections into a location above a plane. The offset roller may move in and out of a plane. The offset roller may contact a stop due to the offset roller being located in a different plane than the other rollers.

The one or more canisters may function to store the tonneau sections when the tonneau sections are moved from a closed position to a stored position. The one or more canisters may be located below a top of the truck bed. The one or more canisters may extend into a truck bed, through a truck bed, or both. The one or more canisters may include one or more tracks. The one or more tracks in the canister may permit the tonneau sections to curve or bend within the canister so that the tonneau sections are stored and protected. The one or more canisters may angle the tonneau sections so that the tonneau sections are stored and are controllably moved into the canister. The one or more canisters may be connected to a bed, a forward wall of a bed, one or more side walls of a bed, or a combination thereof. The one or more canisters may extend at an angle relative to the tonneau cover. The angle may be about 150 degrees or less, about 135 degrees or less, about 115 degrees or less, or about 105 degrees or less. The angle may be about 60 degrees or more, about 75 degrees or more, or about 90 degrees or more. The canister may include one or more covers.

The one or more covers may function to seal sides of the canister, prevent the tonneau sections from being contaminated when the tonneau sections are located within the canister, or both. The one or more covers may be an integral part of the canister. The one or more covers may be removable. The one or more covers may snap on, be fastened on, or both. The one or more canister covers may be located on a side, a front, a back, a bottom, or a combination thereof. The one or more canister covers may be made of metal, aluminum, titanium, steel, a polymer, a thermoset, or a combination thereof. The one or more covers may include one or more apertures, one or more tracks, or both.

The one or more apertures may function to allow movement of one or more parts of the canister. The one or more apertures may allow the pulley, a pulley shaft, guides, or a combination thereof to move within the canister, outside of the canister cover, along the cover, relative to a track, or a combination thereof. The one or more apertures may assist in guiding motion of a pulley, a pulley shaft, or both. The one or more apertures, may be round, oval, symmetrical, asymmetrical, or a combination thereof. Preferably, there are a plurality of apertures. The apertures may all be the same size. Preferably, one aperture is larger than the other apertures (e.g., 2 apertures). A largest aperture may be located between two smaller apertures. The apertures may be sized to be relatively the same size as a pulley shaft, a guide, or both. The apertures may each receive one or more pulley shafts, one or more guides, or both. The apertures may be covered by a pulley, a pulley connector, a pulley plate, or a combination thereof. The plurality of apertures may movably connect a pulley to a canister cover, a canister, or both.

The apertures may extend parallel to one another. The apertures may be round, linear, arcuate, oval, square, rectangular, or a combination thereof. The apertures may be parallel to a track. The apertures may be parallel to a track and assist in guiding movement of a pulley in a direction parallel to the track as the pulley is moved.

The one or more tracks function to guide the tonneau cover into and out of the canister. The one or more tracks may prevent a first portion (e.g., an inner section) of a tonneau cover from contacting a second portion (e.g., an outer section) of a tonneau cover. The one or more tracks may assist in storing the tonneau cover. The one or more tracks may assist is slowing the tonneau cover as the tonneau cover extends into the canister. The one or more tracks may be or include a section that is generally circular, oval, "U" shaped, "C" shaped, or a combination thereof. The one or more tracks may have two portions that are parallel to each other. The one or more tracks may have two portions that are converging. For example, an inner track and an outer track may be angled such that the inner track and the outer track converge towards each other. The one or more tracks may have two portions that are diverging. The one or more tracks may have a portion that turns a tonneau cover about 150 degrees or more, preferably about 175 degrees or more, or even about 180 degrees or more. The track may extend to the bed. The track may extend through the bed. For example, the canister may extend through the bed so that a portion of the tonneau cover is stored under the bed. The track may guide a portion of the tonneau cover parallel to the bed. The one or more tracks may have one or more segments. Preferably, the track has a plurality of segments that control movement of the tonneau cover within the canister. The track may include one or more outer tracks, one or more inner tracks, one or more curved tracks, a track one, a track two, a track three, or a combination thereof.

The one or more outer tracks may function to store one or more outer sections of the tonneau cover. The one or more outer tracks may be a lead into the canister, the track, or both. The one or more outer tracks may be an end of the track. The one or more outer tracks may face a forward end of a bed or a rear end of a bed. The one or more outer tracks may extend from a top of the bed to a bottom of the bed. The one or more outer tracks may store one or more outer sections when the one or more outer sections are in the stored position. The one or more outer tracks may be a track one. The one or more outer tracks may be an outer scroll of a track with a plurality of concentric tracks. The track one may extend fully or partially around a track two. The track one, track two, track three, or a combination thereof may extend about 270 degrees or more, about 300 degrees or more, or about 360 degrees. The track one, track two, track three, or a combination thereof may be a complete circle where a first end and a second end are offset and have a different diameter. The one or more outer tracks may be connected to one or more curved tracks or the track one may be connected to a track two.

The one or more curved tracks may function to store one or more sections of the tonneau cover; change a position of the tonneau cover from a first direction to a second direction; curve one or more sections from the outer track to the inner track. The one or more curved tracks may change an angle of the tonneau cover by about 90 degrees or more, about 135 degrees or more, about 165 degrees or more, or about 180 degrees or more. The one or more curved tracks may change an angle of the tonneau cover by about 360 degrees or less, about 275 degrees or less, or about 225 degrees or less. The one or more curved tracks may be or include a generally "U" shape, "C" shape, or a combination of both. The one or more curved tracks may be a track two. The track two may be a complete circle. The track two may be generally circular with a first end and a second end with different diameters. The track two may be located between a track one and a track three. The track two may be concentric with track one and track three. Track two may have a cross-sectional thickness that gradually decreases as track two extends from a first end to a second end. The one or more curved tracks may be generally arcuate. The one or more curved tracks may be a series of curved tracks connected together. The one or more curved tracks may guide a leading end of the tonneau cover from the outer track to the inner track. In the stored position, one or more curved sections may be stored within the curved track. The one or more curved sections may be located between and connect one or more outer tracks and one or more inner tracks.

The one or more inner tracks may function to store an inner section, slow the tonneau cover as the tonneau cover moves into the stored position, guide the tonneau cover into a second direction, or a combination thereof. The one or more inner tracks may receive one or more inner sections of the tonneau cover. The one or more inner tracks may extend at an angle relative to the outer tracks, the curved tracks, or both. The one or more inner tracks may be located closest to the front of the bed. Preferably, the one or more inner tracks may be located between the outer track and a rear of the bed. The one or more inner tracks may slow the tonneau cover as the tonneau cover moves up the inner track. The one or more inner tracks may store the inner sections when the tonneau cover is in the stored position. The one or more inner tracks may be shorter than the one or more outer tracks. The one or more inner tracks may end below the tonneau cover, a track at a top of the bed, or both. The one or more inner tracks may be a track three. The track three may be located inside of a track one and a track two. The track three may be a last track within a plurality of tracks. The track three may be concentric with track one, track two, or both. Track three may be generally circular. Track three may be a scroll with a gradually decreasing cross section so that as a tonneau cover extends along the track, the tonneau cover is wrapped up within the track and stored. The one or more inner tracks may assist one or more retraction systems in slowing the tonneau cover; removing the tonneau cover from the canister; maintaining a constant speed during entry or exit from the canister; maintaining a constant force to store or retract the tonneau cover from the canister; or a combination thereof.

The one or more retraction systems function to assist in removing the tonneau cover from the canister, assist in extending the tonneau cover into the canister, or both. The one or more retraction systems function to maintain a constant force or speed for retracting or deploying a tonneau cover. The retraction system may include one or more bias members, one or more lines, one or more pulleys, one or more drive rollers, or a combination thereof that are in communication with the tonneau cover to assist in controlling movement of the tonneau cover. The retraction system may include one or more drive rollers, one or more driver roller axes, one or more pulleys, one or more pulley axes, one or more shafts, one or more adjuster shafts, one or more pulley shafts, one or more bias devices, one or more pins, one or more guides, one or more lines, one or more clamps, one or more adjusters, one or more, end plates, one or more support arms, one or more support brackets, one or more guides, one or more mounting parts, or a combination thereof.

The one or more drive rollers may communicate a force from a bias member to a tonneau cover via one or more lines. The one or more drive rollers may communicate a force to a drive gear. The drive gear may be directly driven by a driver roller. The one or more drive rollers may be a ground and a pulley, a bias member, or both may rotate relative to the drive roller. Preferably, the one or more drive rollers are connected to one or more pulleys and drive the pulleys so that the pulleys retract a line and the pulleys drive the drive rollers to deploy a line. The one or more drive rollers may rotate about an axis, a shaft, an adjuster shaft, the bias member, or a combination thereof. The shaft, adjuster shaft, or both may be an axis of the drive roller (i.e., drive roller axis). The one or more drive rollers may be in communication with a bias device. The one or more drive rollers may be directly connected to the bias member, a shaft, an adjuster shaft, or a combination thereof. Preferably, the one or more drive rollers may be connected to an adjuster shaft and when the adjuster shaft is moved by the bias member the drive roller may be rotated. More preferably, the drive roller and the adjuster shaft rotate about a shaft. The one or more bias members may extend through an internal location of the drive roller. The one or more bias members may extend around an outside of a drive roller. The drive roller may be hollow, solid, or a combination of both. A drive roller may be located at one or both ends of the shaft, the adjuster shaft, or both. The drive roller may be located on the passenger side, the driver side, or both. The driver roller may be connected to one or more lines. The drive roller may deploy or retract the one or more lines. The one or more lines may extend between the drive roller and the tonneau cover so that if the drive roller moves in a first direction the tonneau cover is deployed and if the tonneau cover moves in a second direction the tonneau cover is retracted. The one or more drive rollers may apply a linear amount of force so that a constant force is applied to the tonneau cover as the tonneau cover moves along the track. Preferably, the drive roller applies a varying amount of force so that as the tonneau cover moves along the track the amount of force varies to maintain a constant speed or force to deploy, retract, or both the tonneau cover. For example, as the tonneau cover extends into the canister, the tonneau cover may be pulled down into the canister by gravity and as more tonneau cover moves into the canister an amount of force required to slow the tonneau cover may increase so that the drive roller carries more of a load and an amount of force applied by a user remains substantially constant along an entire deployment or retraction of the tonneau cover. The one or more drive rollers may be made of metal, plastic, iron, steel, stainless steel, titanium, aluminum, or a combination thereof. The one or more drive rollers may include one or more drive roller shafts, one or more drive gears, or both.

The one or more drive gears may function to move a tonneau cover between a stored position and a closed position. The one or more drive gears may be in direct communication with a roller, the tonneau cover, a tonneau section, the track, or a combination thereof. The one or more drive gears may extend between the rollers to move the tonneau cover. The one or more drive gears may directly move the tonneau cover as the drive gear rotates. The one or more drive gears may be directly connected to the drive roller, the drive shaft, or both. The one or more drive gears may rotate about an axis. The one or more drive gears may include a body and one or more teeth.

The body may function to connect the drive gear to a drive roller shaft. The body may support one or more teeth. Preferably, the body supports a plurality of teeth. The body may be circular. The body may rotate about an axis. The body may connect to a drive roller shaft by one or more bearings. The body may be made of or include metal, plastic, a polymer, iron, steel, or a combination thereof. The body may support one or more teeth.

The one or more teeth function to impart a force onto the tonneau cover to close the cover or assist in opening the tonneau cover. The one or more teeth may extend from the body and move the tonneau cover, the rollers, or both. The one or more teeth may extend between rollers. The one or more teeth may contact a roller or a roller support to move the tonneau cover. The one or more teeth may extend cantilever from the body. The one or more teeth may be triangular in shape, square in shape, "J" shaped, or a combination thereof. The one or more teeth may extend a sufficient length between the rollers to move the rollers. The teeth may extend a length that is greater than half of a diameter of the roller. The teeth may drive the rollers, the tonneau cover, or both as the drive roller shaft rotates the drive gear.

The one or more drive roller shafts may function to connect the drive roller to a bias member. The one or more drive roller shafts may lock the drive roller to a shaft. The one or more drive roller shafts may be directly connected to an adjuster. The one or more drive roller shafts may be indirectly connected to an adjuster via one or more bias members. The one or more drive roller shafts may connect to the shaft via one or more retention fasteners. The drive roller may extend through a drive roller. The driver roller may be free of a drive roller shaft. The one or more drive roller shafts may include one or more bearings. Preferably, the one or more drive rollers, drive roller shafts, or both may be directly driven by the shaft and the shaft may rotate about one or more bearings that are connected to the end plate. The one or more drive roller shafts may be formed with the drive roller so that they are one piece. Preferably, the drive roller shaft is connected to the drive roller via one or more fasteners. The one or more drive roller shafts may have a portion that extend into the one or more bias members so that the bias member is connected to the drive roller shaft. The one or more drive rollers may work with one or more pulleys to deploy or retract a tonneau cover, connect to one or more bearings, connect to one or more bearing carriers, be connected to one or more retaining rings, or a combination thereof.

The one or more bearings may function to allow one or more drive rollers, one or more shafts, one or more drive roller shafts, one or more adjuster shafts, one or more pulley shafts, or a combination there of to rotate about an axis. The one or more bearings may connect a shaft, roller, drive roller, or a combination thereof to a bearing carrier, an end plate, a canister cover, or a combination thereof. The one or more bearings may be a low friction device that allows for rotational movement of a bearing or a shaft discussed herein. The one or more bearings may fixedly secure one or both ends of a shaft or roller to a stationary device and allow for rotational movement of the shaft or roller relative to the stationary device (e.g., end plate or canister cover). The one or more bearings may be located within or connected to one or more bearing carriers that connect the one or more bearings to a stationary device.

The one or more bearing carriers may function to connect one or more bearings to a roller, a shaft, a stationary device, a drive roller, or a combination thereof so that the one or more rollers, one or more shafts, drive rollers, or a combination thereof may rotate about an axis. The one or more bearing carriers may house one or more bearings. The one or more bearing carriers may be part of an end plate, a canister cover, or both. The one or more bearing carriers may be bolted to the canister, an end plate, a canister cover, or a combination thereof. The one or more bearing carriers may be an integral part of a canister, an end plate, a canister cover, or a combination thereof. The bearing carriers may hold a shaft, a roller, or both in place. The bearing carrier, bearing, one of the shafts discussed herein, rollers discussed herein, or a combination thereof may be held in place by one or more retaining rings.

The one or more retaining rings may function to retain a bearing, a driver roller, drive roller shaft, adjuster shaft, shaft, pulley shaft, or a combination thereof with the tonneau system, a canister, or a combination thereof. The one or more retaining rings may be located within a wall of a canister. The one or more retaining rings may be located on an outside wall of a canister and the shaft, roller, or both may be located on an opposite wall as the retaining rings. The one or more retaining rings may extend though a shaft, a roller, or both. The one or more retaining rings may extend around all or portion of a circumference of the shaft. The one or more retaining rings may be a cotter pin, a circlip, a clip that extends into a shoulder in the shaft or roller. The one or more retaining rings may prevent axial movement of a shaft or roller. The one or more retaining rings may prevent the shaft, the roller, or both from moving through a wall, an end plate, a support bracket. The one or more retaining rings may maintain alignment between the shaft, the drive roller, or both and one or more pulleys. The one or more pulleys function to assist the tonneau cover is moving along the curved track, maintaining a constant amount of force applied by the retraction system, retracting the tonneau cover, deploying the tonneau cover, change a direction of cable pull as the cover is opened and closed, or a combination thereof. The one or more pulleys may function to retract and deploy the tonneau cover. The one or more pulleys may function to wrap up or deploy the one or more lines. The one or more pulleys may be rotated by the one or more drive rollers. The one or more pulleys may be in direct contact with a line. The one or more pulleys may function as a drive roller when in direct contact with a line, when corotating with a shaft, or both. The one or more pulleys may assist a drive roller when the one or more pulleys are located in a separate axis from the shaft, the drive roller shaft, or both. The one or more pulleys may be longitudinally static, laterally static, or both. The one or more pulleys may longitudinally move, rotationally move, or both. The one or more pulleys may be in contact with the one or more lines at all times. Preferably, the one or more pulleys are free of contact with the one or more lines until the tonneau cover is adjacent to the one or more pulleys. The one or more pulleys may be contacted by the one or more one lines as the one or more lines begin to wrap around the one or more pulleys. The one or more pulleys may be contacted by a line that wraps about 150 degrees or more, about 180 degrees or more, about 225 degrees or more, or about 275 degrees or more about the pulley. The pulley may rotate about a pulley axis as the line extends around the pulley. The pulley may assist in guiding the line, the tonneau cover, or both around the curved track, the pulley, or both. The pulley may longitudinally move as the line contacts the pulley, the tonneau cover extends around the pulley, or both. The pulley may move in a direction parallel to the inner track, the outer track, or both tracks. Movement of the pulley may dissipate a force along the outer track as the tonneau cover changes to move along the curved track, the inner track, or both. The pulley may only move longitudinally as the tonneau cover moves along the inner track. The pulley may be pulled upward as the tonneau cover moves up the inner track (i.e., towards a stored position). The pulley may apply a force to the tonneau as the tonneau cover moves downward along the inner track (i.e., towards a closed position) so that the pulley assists a user in removing the tonneau cover from the canister. The pulley may be connected to a pulley shaft that extends along the pulley axis. The one or more pulleys may be supported cantilever by one or more pulley shafts, one or more guides or both.

The one or more pulley shafts function to support the pulley, connect the pulley to the canister, move the pulley longitudinally, support the pulley as the pulley rotationally moves, or a combination thereof. The one or more pulley shafts may rotate. The one or more pulley shafts may be static. The one or more pulley shafts may be a bearing surface that the pulley rotates about. The one or more pulley shafts may include one or more bearings that the pulley rotates about. The one or more pulley shafts may be solid or hollow. The one or more pulley shafts may be made of plastic, metal, iron, stainless steel, aluminum, titanium, or a combination thereof. The one or more pulley shafts may extend from an interior of the canister to an exterior of the canister. The one or more pulley shafts may extend through an aperture in the canister cover. The one or more pulley shafts may be connected to the canister, the canister cover, or both. The one or more pulley shafts may be connected to one or more pulley plates.

The one or more pulley plates may function to support a pulley, a pulley shaft, or both. The one or more pulley plates may assist in moving the pulley. The one or more pulley plates may prevent the pulley from rotating as the pulley is contacted by the one or more lines. The one or more pulley plates may assist the pulley shaft in remaining substantially normal to the canister, the canister cover, or both (e.g., within about 5 degrees or less, about 3 degrees or less, or about 1 degree or less). The one or more pulley plates may prevent the pulley from moving into the aperture. The one or more pulley plates may prevent the pulley, the pulley shaft, or both from being pulled out of an axis. The one or more pulley plates may be larger than the aperture. The one or more pulley plates may have a portion that extends on each side of the aperture regardless of the position of the pulley. The one or more pulley plates may act as a bearing surface. The one or more pulley plates may slide along the canister cover as the line creates tension on the pulley. The one or more pulley plates may prevent tipping of the pulley, the pulley shaft, or both. The one or more pulley plates may assist the pulley in moving longitudinally (e.g., towards the drive roller), moving laterally (e.g., in a direction from a forward end towards a rear end of a bed), or a direction therebetween. The one or more pulley plates may assist the pulley in moving along a directional component. The tonneau system may include a height direction, a length direction, and width direction, and the pulley may move in a direction there between. For example, the pulley may move in a height direction and may move in a length direction. The pulley may only move with the pulley plate along one directional component (e.g., height or length). The pulley plate, the guide, or both may guide the pulley directly towards the drive roller, rotationally towards the drive roller, longitudinally towards the drive roller, or a combination thereof. The one or more pulley shafts, one or more pulley plates, or both may include one or more shaft flanges that connect the pulley shaft to the canister cover.

The one or more shaft flanges function to movably connect the pulley shaft to the canister cover. The one or more shaft flanges may hold the pulley shaft static as the pulley rotates about the pulley shaft. The one or more shaft flanges may rotate with the pulley shaft and the pulley. The pulley shafts may rotate with the pulley and the pulley shaft may rotate within the shaft flange. The shaft flange may act as a bearing surface. The shaft flange may include a bearing that is in communication with the pulley shaft. The shaft flange may have a portion that is located on an inside of the canister and a portion that is located on an outside of the canister. The shaft flange may have a first flange wall that extends on a first side of the canister cover and a second flange wall that extends on a second side of the canister cover. The shaft flange may include a gap or a space between a first flange wall and a second flange wall. The gap or space may be a groove in the shaft flange that receives that canister cover but connects the first flange wall to the second flange wall. The first wall, the second wall, or both may have a cross-sectional length (e.g., diameter, width, or length) that is greater than a width of the aperture so that the shaft flange cannot be moved through the aperture, once the shaft flange is connected to the canister wall. The shaft flange may be one solid piece. The shaft flange may be two pieces that are connected together. The shaft flange may allow the pulley shaft to move along an aperture, rotate within the aperture, or both. The one or more pulley shafts may move along a linear path. The one or more pulley shafts may move along an arcuate path. The one or more pulley shafts may be connected to a swing arm and the swing arm rotationally move along the canister cover, within an aperture in the canister cover, or both. The pulley shaft may be connected to an arm that may move the pulley along an arcuate path. The shaft flange may assist in supporting a pulley shaft cantilever, the pulley cantilever, or both. The shaft flange may carry a load as the line contacts the pulley and the pulley assists in guiding the tonneau cover, moving the tonneau cover into a stored position, or both. The shaft flange may be one or more washers, nuts, or both that are connected to the pulley shaft. The one or more shaft flanges may have a "U" shaped portion when viewed in a cross section that receives a portion of the canister cover. The shaft flange may assist the pulley shaft, the pulley, or both in longitudinally moving as a bias device, the tonneau cover, the line, or a combination thereof import one or more forces on the pulley.

The one or more bias devices may function to resist movement of a pulley shaft, the pulley, the line, or a combination thereof. The one or more bias devices return a pulley, pulley shaft, or both to a resting state, a closed position or both. The one or more bias devices may assist in moving a pulley, a pulley shaft, or both. The one or more bias devices may resist movement of the pulley so that the pulley assists in slowing or stopping a tonneau cover as the tonneau cover approaches a final stored position. The one or more bias devices may be a plurality of bias devices. Each pulley shaft may be connected to one or more bias devices. The one or more bias devices may assist in moving the tonneau cover so that an initial force to move the tonneau cover from a final stored position is partially applied by the bias device. The bias device may apply a force that is about 10 percent or more, about 20 percent or more, about 30 percent or more, about 40 percent or more, or even about 50 percent or more of a total force needed to start a tonneau cover moving from a final stored position towards a closed position. The bias device may apply a force that is about 95 percent or less, about 85 percent or less, or about 85 percent or less of a force needed to start a tonneau cover moving from a final stored position towards a closed position. The bias device may be made of a polymer, plastic, metal, a spring steel, rubber, elastomer, a reinforced material, Kevlar, or a combination thereof. Preferably, the bias device is one or more elastic bands such as rubber bands or a spring that elastically deform when the tonneau cover is moved towards the stored position and return to substantially an original state when the tonneau cover moves towards a closed position. The one or more bias devices may extend between and connect a pulley shaft and a pin.

The one or more pins may function to ground one or more portions of a bias device. The one or more pins may be fixedly connected to the canister cover. The one or more pins may form a fixed point. The one or more pins may be an integral part of the canister, the canister cover, or both. The one or more pins may be adjustable. The one or more pins may be movable so that a user can adjust an amount of force the bias device applies to the pulley shaft, the pulley, or both. The one or more pins may extend from the inside, the outside, or both of the canister. The one or more pins may be made of the same material as the canister, the canister cover, or both. The one or more pins may be welded, threaded, glued, adhered, or a combination thereof to the canister cover. The one or more pins may be made of metal, plastic, the same material as the canister, or a combination thereof. The one or more pins may allow the bias devices to stretch so that the bias devices assist in retracting the pulley, the pulley shaft, or both. The one or more pins may be a stationary object that the bias devices may connect to and when the pulley shaft, the pulley or both move, the one or more pins may ground the bias devices so that upon an event ending the bias devices assist in moving the pulley shaft, the pulley, or both back to a beginning position (e.g., a closed position). The one or more pins may be located proximate to one or more guides.

The one or more guides may function to control movement of the pulley shaft, the pulley, or both as the tonneau cover moves along the track. The one or more guides may function to guide the one or more lines. The one or more guides may control the position of the one or more lines and the pulley's relative to each other. The one or more guides may guide the line within a first plane, a second plane, a parallel relationship to the tonneau cover, or a combination thereof. The one or more guides may align the line with the pulley. The one or more guides may align a line that extends between an end of a tonneau cover and the pulley. The one or more guides may guide the line as the tonneau cover moves between a closed position and a stored position. The one or more guides may maintain the line, the pulley, the tonneau cover, or a combination thereof in line as the tonneau cover moves, the pulley moves, or both. The one or more guides may guide the line along or under a rail, an underbody rail, a track, or a combination thereof. The one or more guides may guide the line, the pulley, the tonneau cover, or a combination thereof during movement. The one or more guides may prevent the pulley shaft, the pulley, or both from twisting relative to a rotational axis of the pulley shaft, the pulley, or both. The one or more guides may extend along the canister, the canister cover, or both as the pulley shaft, the pulley, or both move. The or more guides may extend through the canister, the canister cover, or both. The one or more guides may be a projection that extends through an aperture. The one or more guides may extend along a track, parallel to a track, or both. The one or more guides may prevent the line from contacting the track. The one or more guides may assist in guiding the pulley shaft, the pulley, or both longitudinally (i.e., up and down relative to the top and bottom of a bed). The one or more guides may restrict the pulley shaft, the pulley, or both from moving laterally (i.e., side to side relative to a front and back of a bed). The one or more guides may restrict movement of the pulley so that the direction of movement of the pulley is substantially only in a desired direction of movement. The one or more guides may assist the pulley, the pulley shaft, or both in having a direction of movement that is parallel to the inner track, the outer track, an angle of the canister, or a combination thereof. The one or more guides, one or more line rail grommets, or both may assist the pulley in moving in one direction as a line wraps around the pulley.

The one or more line rail grommets function to align the line with the pulley and maintain the line a predetermined distance away from the track. The one or more line rail grommets may maintain a line within a first plane, a second plane, or change an angle of extension of a line. The one or more line rail grommets may connect to a track. The one or more line rail grommets may extend between a track and a tonneau cover, connect to a line, or both. The one or more line rail grommets may have a cantilever connection. The line rail grommet may assist a guide in aligning a line along the tonneau sections. The line rail grommets may extend the line from a plane under the underbody rails, track, or both to a plane above the underbody rails, the track, or both. The one or more line rail grommets may have a top plate and a bottom plate and the line may extend therebetween. The one or more line rail grommets may include a groove that holds a line and the line extends through. The one or more line rail grommets may be a pulley. The one or more line rail grommets may be a dual pulley system that maintains the line with a linear relationship. The one or more line rail grommets may be one or more pins that guide the line along a plane or maintain a linear relationship. The one or more line rail grommets may be a pin with a loop that receives the line and controls the orientation of the line. The one or more line rail grommets may be a wear block that the line slides through. The wear block may be made of poly, plastic, a low friction material, have a coating, include metal, be a coated metal material, or a combination thereof. The line rail grommet may assist the line in extending from a distal end of the tonneau cover to the pulley so that the line assists the tonneau cover in opening and closing.

The one or more lines may function to assist a tonneau cover in retracting, deploying, being stored, movement, or a combination thereof. The one or more lines may extend directly from a drive roller to the tonneau cover. The one or more lines may extend along a first plane, a second plane, parallel to the tonneau cover, or a combination thereof. The one or more lines may be connected to the driver roller and one or more sections of the tonneau cover. The one or more lines may extend between a driver roller and an inner section, outer section, curved section, or a combination thereof of the tonneau cover. Preferably, the one or more lines connect to an inner section of the tonneau cover. The one or more lines may be free of contact with the pulley when the tonneau cover is in the closed position. The one or more lines may extend around a portion of the pulley when the tonneau cover is in the stored position. The one or more lines may wrap around the drive roller one or more times so that as the tonneau cover moves from the closed position to the stored position the line is unwound from the drive roller. The one or more lines may be located on the driver side, the passenger side, or both of the retraction system. The drive roller, the lines, the pulley, or a combination thereof may be located only on the driver side or the passenger side. The one or more lines may be made of cable, a belt, a braided cable, a rope, an aircraft cable, a twisted cable, steel, stainless steel, a flexible material, a sprocket, a cog, a toothed rotational member, an endless loop continuous member, or a combination thereof. The amount of tension placed on the cable by the drive roller and the bias member may be adjusted by a user adjusting a position of a shaft, an adjuster shaft, an adjuster, a clamp, a tensioner, or a combination thereof.

The one or more tensioners may function to ground one end of the bias member. The one or more tensioners may connect the bias member to an end plate. The one or more tensioners may include one or more apertures that receive an end of the bias member. The one or more tensioners may extend through a pulley. The one or more tensioners may extend through a pulley so that the pulley may rotate about the tensioner with the drive roller while an end of the bias member is maintained in a static position. The one or more tensioners may extend through the bearing, through the bearing carrier, or both. The one or more tensioners may be in direct communication with an end plate. The one or more tensioners may be rotationally locked in place by a retaining ring, the end plate, or both. The one or more tensioners may apply a pre-load to the bias member. An amount of pre-load, load, or both created by or released by the bias member may be varied by adjusting the position of the tensioner, the bias member, or both. The one or more tensioners may include or be part of an adjuster that allows a user to increase or decrease an amount of assistance provided in retracting or deploying a tonneau cover by adjusting one or more clamps, one or more adjusters, one or more adjuster shafts, or a combination thereof.

The one or more clamps may function to retain a position of a shaft, an adjuster shaft, an adjuster, or both. The one or more clamps may prevent rotation of the adjuster, the shaft, the adjuster shaft, or a combination thereof without tensioning or releasing tension of the bias member. The one or more clamps may prevent rotation of the adjuster shaft relative to the adjuster. The one or more clamps may prevent rotation of an outer race of an adjuster while allowing rotation of an inner race of an adjuster with an adjuster shaft. The one or more clamps may be connected to an adjuster, the adjuster shaft, or both. The one or more clamps may be two pieces that connect together. The one or more clamps may be connected together and then compressed to grip the adjuster, the adjuster shaft, or both. The one or more clamps may ground the one or more adjusters (e.g., the adjuster shaft) so that the adjuster shaft does not move as the shaft moves. The one or more clamps when in a release position may allow for movement of the adjuster, the adjuster shaft, or both so that tension on the one or more bias members may be increased or decreased. The one or more clamps may prevent axial movement of the adjuster by one or more fasteners being located on a first side, a second side of both of the one or more clamps. The one or more clamps may prevent rotation of the adjuster, the adjuster shaft, or both when the clamp is in a clamped position.

The one or more adjusters may function to prevent rotation of the one or more bias members when the adjuster and the clamp are in a clamped state. The one or more adjusters may function to permit rotation of the one or more bias members to increase or decrease an amount of force generated by the one or more bias members. The one or more adjusters may be in communication with a first end of the one or more bias members. The one or more adjusters may extend around the shaft. The one or more adjusters may be movable relative to the shaft. The one or more adjusters may be movable with the shaft. The one or more adjusters may be a bearing surface so that the shaft can move relative to the adjuster. The one or more adjusters may include an adjuster shaft that extends from the adjuster and into or around an end of the one or more bias members so that the adjuster is in direct communication with the one or more bias members.

The one or more adjuster shafts may function to connect the adjuster to the one or more bias members. The one or more adjuster shafts may extend into the bias member. The one or more adjuster shafts may extend around the bias member. The one or more adjuster shafts may receive a portion of the one or more bias members. The one or more adjuster shafts may be part of the adjuster (i.e., one piece). The one or more adjuster shafts may be connected to the adjuster by one or more fasteners. The one or more adjuster shafts may extend cantilever from the adjuster. The one or more adjuster shafts may be free of contact with the shaft. The one or more adjuster shafts may only contact the adjuster and the bias member. The one or more adjusters, the one or more adjuster shafts, or both may include one or more adjuster apertures.

The one or more adjuster apertures function to assist a user in increasing or decreasing an amount of tension, amount of force, amount of torque, or a combination thereof created by the one or more bias devices. The one or more adjuster apertures may assist a user in rotating the adjuster, the adjuster shaft, the one or more bias members, or a combination thereof. The one or more adjuster apertures may temporarily receive one or more leverage devices that assist in moving the adjuster to change the position of the one or more bias members. The one or more adjuster apertures may receive a leverage device that assists a user in rotating the adjuster when the one or more clamps are released from the adjuster. The one or more adjuster apertures may be a hole, a recess, or both that receive a device such as a leverage device that assists in rotating the adjuster, the bias member, or both. The one or more adjuster apertures may be round, square, triangular, diamond, oval, rectangular, octagonal, a geometric shape, or a combination thereof. The one or more adjuster apertures may assist a user in rotating the adjuster about one or more adjuster sleeves, one or more shafts, or both.

The one or more adjuster sleeves may function to permit rotation of the shaft relative to the adjuster, the adjuster shaft, or both. The one or more adjuster sleeves may be a bearing between the adjuster, the adjuster shaft, or both and the shaft. The one or more adjuster sleeves may be a bearing, include one or more bearing surfaces, or both. The one or more adjuster sleeves may be a polymeric material and the adjuster, the adjuster shaft, or both and the shaft may be made of metal and may rotate relative to the adjuster sleeve. The one or more adjuster sleeves may slide over the shaft. The one or more adjuster sleeves may be located within the adjuster, the adjuster shaft, or both. Preferably, the one or more adjuster sleeves create an interface between the adjuster, the adjuster shaft, or both and the shaft so that the shaft may rotate relative to the adjuster, the adjuster shaft, or both. The adjuster sleeve may permit rotation of the shaft with the bias member but assist in preventing motion of the adjuster with the movement of the bias member, the shaft, or both.

The one or more bias members may function to store energy when the tonneau cover is moved in a first direction and to release energy when the tonneau cover is moved in a second direction. The one or more bias members may resist movement of the tonneau cover in a first direction (e.g., a storage direction). The one or more bias members may assist movement of the tonneau cover in a second direction (e.g., a closing direction). The one or more bias members may be or include a spring, an elastomeric material, a motor, a passive device, an active device, or a combination thereof. Preferably, the one or more bias members are a compression spring, a torsion spring, an extension spring. The bias member may extend from a first end (e.g., driver side) to a second side (e.g., passenger side) of a vehicle, retraction system, or both. The one or more bias members may be located only in the end regions. The one or more bias member may be only located in a center region. Preferably, the one or more bias members are located in either a first end region or a second end region. More preferably, the one or more bias members extend from an end region towards a center end region. The retraction system may include one bias member one each side that individually moves or moves with a side of the tonneau cover. The retraction system may include only one bias member. The one or more bias members may be located within a shaft, a drive roller shaft, an adjuster sleeve, an adjuster shaft, or a combination thereof. Preferably, the one or more bias members are located around a portion of the shaft, the drive roller shaft, the adjuster shaft, the adjuster sleeve, or a combination thereof.

The one or more shafts function to connect a first side of the tonneau cover (e.g., passenger side) to a second side of the tonneau cover (e.g., driver side). The one or more shafts may transfer a force, torque, or both from a first side to a second side. The one or more shafts may rotate the drive roller, the drive roller shaft. The one or more shafts may move in a first direction and a second direction. In a first direction the line, the tonneau cover, or both may be moved to a stored position. In a second direction the line, the tonneau cover, or both may be moved into a closed position. The one or more shafts may only move a drive roller on a first end. The one or more shafts may be solid or hollow. The one or more shafts may be made of metal, plastic, a polymer, a thermoplastic, aluminum, steel, titanium, stainless steel, or a combination thereof. The one or more shafts may be supported by one or more bearings, bearing surfaces, or both.

The one or more bearings function to support the one or more shafts. The one or more bearings function to allow rotational movement of the shaft. The one or more bearings may support a first end, a second end, a middle region, or a combination thereof of the one or more shafts. The one or more bearings may support the shaft relative to one or more support brackets, one or more end plates or both.

The one or more end plates may function to support the retraction system, a shaft of the retraction system, or both. The one or more end plates may function to connect the retraction system to a bed. The one or more end plates may support one or more bearings that support the one or more shafts. The one or more end plates may ground (e.g., prevent movement) a portion of the retraction system. The one or more end plates may be supported by one or more support arms, the bed, or both. The one or more end plates may support a drive roller that provides support to a bias member end plate.

The bias member end plate may function to support one end of a bias member. The bias member end plate may form a connection with the drive roller. The bias member end plate may rotate with the driver roller. Preferably, the bias member end plate and the drive roller are static relative to each other and move with or drive a pulley relative to a bias member. The bias member end plate may maintain one end of a bias member in a static relationship so that as a second end of the bias member moved energy is stored or released from the bias member. Preferably, the bias member end plate connects one end of a bias member to the drive roller to rotate an end of the bias member and a tensioner on a second end prevents movement of the bias member. The bias member end plate may assist in facilitating the storage and release of energy within the bias member. The bias member end plate may be locked to the drive roller, an end plate, or both. The bias member end plate may be a cap that extends within an end of a bias member. The bias member end plate may receive an end of the bias member to connect to the bias member. The bias member end plate may have a portion that extends into the bias member and a portion that creates an interference fit with an inner location of a drive roller so that the bias member end plate and drive roller rotate with each other. The bias member end plate may be made of or include metal, plastic, rubber, an elastomer, steel, iron, a phenolic, nylon, or a combination thereof. The bias member end plate may be in communication with and supported by the one or more support arms.

The one or more support arms may function to support the retraction system, the one or more shafts, connect the retraction system to the bed, or a combination thereof. The one or more support arms may extend from a first side (e.g., driver side) to a second side (e.g., passenger side). The one or more support arms may support one or more support brackets that support a portion of the retraction system. The one or more support arms may support an end of the spring that does not fully extend across a bed, the shaft, a clamp, or a combination thereof. The one or more support arms may be cylindrical, rectangular, square, or a combination thereof. The one or more support arms may support one or more support brackets.

The one or more support brackets function to support the retraction system while allowing rotational movement of the shaft, the drive roller, or both. The one or more support brackets may support one or more clamps. The one or more support brackets may be connected to the one or more clamps. The one or more support brackets may attach to the one or more clamps. The one or more support brackets may prevent movement of the one or more clamps. The one or more support brackets may connect a portion of the retraction system to the support arm. The one or more support brackets may connect to the support arm by one or more fasteners. The one or more support brackets may support one or more mounting parts.

The one or more mounting parts may function to support a portion of the retraction system. The one or more mounting parts may connect a support bracket to the retraction system. The one or more mounting parts may allow movement of the retraction system. The one or more mounting parts may move so that the retraction system may be leveled, adjusted, or both. The one or more mounting parts may assist in connecting a rail cap to the canister, retraction system, or both.

The one or more rail caps may function to connect the roller track to a bed. The one or more rail caps may support a roller track. The one or more rail caps may connect the roller track to the canister. The one or more rail caps may extend along the driver side, passenger side, or both of the bed. The one or more rail caps may connect to the bed by one or more fasteners (e.g., clamp, bolt, screw). The one or more rail caps and the one or more roller tracks may be two pieces that are connected together. The one or more rail caps and the one or more roller tracks may be one piece. The one or more rail caps may be a connection portion, support portion, or both of a roller track.

The one or more roller tracks function to support the tonneau cover, one or more tonneau sections, one or more tonneau caps, or a combination thereof. The one or more roller tracks support the tonneau cover as the tonneau cover moves between a stored position and a closed position. The one or more roller tracks may be a bearing surface that the tonneau cover moves along. The one or more roller tracks may include rollers that the tonneau cover moves along. The one or more roller tracks may be a track that the rollers of the tonneau cover move along. The roller track may include one or more grooves that the rollers move along. The one or more roller tracks may receive a plurality of rollers and assist the plurality of rollers in moving from a front end to a rear end of the bed. The one or more roller tracks may assist the tonneau cover in moving in a straight line so that the tonneau cover does not become misaligned. The one or more roller tracks may include one or more drain channels. The one or more roller tracks may include one or more roller guides. The one or more roller tracks may extend along the driver side, the passenger side, or both. The one or more roller tracks may be generally "C" shaped, "U" shaped, or both. The one or more roller tracks may include one or more tail supports.

The one or more tail supports may function to support one or more tonneau caps that extend cantilever from the tonneau sections, the roller tracks, or both. The one or more tail supports may elevate the tonneau cap from a first plane to a second plane. The one or more tail supports may provide support to the tonneau cap so that the tonneau cap extends above an end of a bed, over a tail gate or both. The one or more tail supports may lift a roller. The one or more tail supports may support one or more rollers so that the one or more rollers are lifted above a plane of the other rollers (e.g., the tail supports may lift one or more rollers from a first plane to a second plane). The one or more tail supports may support a tonneau cap so that when the tonneau cap extends from the roller track the tonneau cap is maintained within a first plane or above a first plane. The one or more tail supports may be a wedge, step, ramp, lifter, curved section of the roller track, or a combination thereof that one or more rollers extend up from a first plane to a second plane or a location above the first plane. The one or more tail supports may be one or more offset rollers. The one or more offset rollers may be located in a different plane then the other rollers so that the tonneau sections, tonneau cap, or both are lifted relative to the tonneau sections with rollers that are not offset. The one or more offset rollers may be located in a plane below the plurality of rollers so that offset rollers lift the tonneau sections, the tonneau cap, or both. The one or more tail supports may only elevate one roller, a roller closest to the tonneau cap, or both. The one or more tail supports may be a static device that supports one or more rollers, one or more tonneau sections, or the tonneau cap so that the tonneau cap, the tonneau sections, or both are free of sag when extended cantilever from the roller track. The one or more tail supports may be located proximate to a rail end cap, be part of a rail end cap, or both.

The one or more rail end caps may function as a stop that retains the tonneau sections within the roller track. The one or more rail end caps may function to permit fluid to exit the roller track. The one or more rail end caps may be located at both ends of the roller track. The rail end caps may only be located at one end of the roller track (e.g., the front end or the rear end). The one or more rail end caps may have a complementary shape to an end of the roller track. The rail end caps may include male portions that extend into the drain channels. The rail end caps may be square shape. The rail end caps may be connected to the roller tracks by one or more fasteners. The rail end caps may include one or more bumpers.

The one or more underbody rails may function to guide the line within a first plane, a second plane, parallel to the tonneau cover, or a combination thereof. The one or more underbody rails may guide the tonneau cover and the one or more lines relative to each other. The one or more underbody rails may separate the tonneau cover, the tonneau cover rollers, or both from the line. The underbody rails may extend along all or a portion of a length of the tonneau cover. The underbody rails may guide the line from a connection location with the tonneau cover to the pulley, the drive roller, or both. The underbody rails may be located on a first side of the tonneau cover, a second side of the tonneau cover, or both. The underbody rails may only be located on a side of the tonneau cover that includes a line. The line may be sandwiched between an underbody rail and a cap so that the line is located within an internal location. The line may extend under the underbody rails. The underbody rails may terminate at a bumper. The one or more bumpers may function to protect the bed, the roller track, or both from rubbing, contact, damage, or a combination thereof. The one or more bumpers may made of plastic, rubber, an elastomer, a soft material, or a combination thereof. The one or more bumpers may be flat. The one or more bumpers may include a raised surface. The one or more bumpers may include one or more peaks. The one or more bumpers may include one or more "v" shaped portion, "U' shaped portions, or both. The one or more bumpers may be compressible. The one or more bumpers may be sufficiently soft so that contact between the bed and the one or more bumpers prevent damage to the bed. The one or more bumpers may be sufficiently hard so that the one or more bumpers prevent movement of the roller track. The one or more bumpers, the one or more rail end caps, or both may include one or more connection features.

The one or more connection features may function to connect the bumper to the rail end cap, the roller track, or both. The one or more connection features be a tongue and groove. The one or more connection features may have a portion of the bumper that extends into the rail end cap. The one or more connection features may be a portion of the bumper that receives a portion of the rail end cap. One or more fasteners may extend through the bumper into the rail end cap to form a connection. The one or more connection features may be a fastener as discussed herein.

The one or more fasteners may function to connect two or more pieces together. The one or more fasteners may be any device that connects two parts of the tonneau system together. The one or more fasteners may be screw, set screw, circlip, tongue and groove, threaded member, unthreaded member, a friction fit, a sliding member, a press fit device, a nut and bolt, a nail, an adhesive, or a combination thereof. The one or more fasteners may include one or more retention fasteners.

The one or more retention fasteners may function to connect a shaft to a drive roller. The one or more retention fasteners may be movable to permit a shaft to move independent of a drive roller and then movable to connect the shaft to the drive roller. The one or more retention fasteners may be a set screw that connects a shaft to the drive roller. The one or more retention features may lock the drive roller to the shaft so that the bias member assists in moving the drive roller. The one or more retention features may be located in the retraction system and be located opposite a roller track.

The one or more drain channels function to channel fluid out of the bed. The one or more drain channels function to collect fluid that extends into the roller track and to guide the fluid out of the bed. The drain channels may guide fluid to drain holes, drain tubes, or both. The roller track may include a plurality of drain channels. All of the drain channels may extend parallel to one another. The drain channels may extend from a front end to a rear end of the bed, the roller track, or both. The drain channels may be located in a bottom of the roller track and the rollers may extend above the drain channels so that the rollers are free of contact with fluid. The drain channels may be connected to drain holes at one end and drain tubes at a second end. The one or more drain channels may receive one or more drain plugs.

The one or more drain plugs function to connect the rail end cap to the roller track, the drain channels, or both. The one or more drain plugs may extend into the one or more drain channels so that a fluid within the drain channels is directed to a desired location. For example, the drain plugs may extend into the drain channels so that the fluid is retained within the drain channels and guided to the drain holes, the drain tubes, or both so that the fluid can only exit through the drain holes, the drain tubes, or both. The one or more drain plugs may be complementary in shape to the one or more drain channels. The one or more drain plugs may be located proximate to the one or more drain holes. The one or more drain plugs may guide fluid to the drain holes, the drain tubes, or both.

The one or more drain tubes may function to guide fluid from the tonneau system, the roller track, of both to a location outside of a bed. The one or more drain tubes may extend through the bed. The one or more drain tubes may extend between a cab and a bed. The one or more drain tubes may extend through a side in the bed. The one or more drain tubes may hang out of a bed. The one or more drain tubes may be connected to the canister. The one or more drain tubes may extend from the canister. The one or more drain tubes channel fluid from the canister to a location outside of the bed. The one or more drain tubes may connect to one or more drain holes. The one or more drain tubes may be used instead of drain holes.

The one or more drain holes may function to allow fluid to exit the roller track and outside of the tonneau system, the bed, or both. The one or more drain holes may be a through hole. The one or more drain holes may extend through the roller track and preferably through the rail end cap. The one or more drain holes may extend outside of the bed. The one or more drain holes may guide fluid out of the tonneau system.

The tonneau system may be connected to any vehicle. Preferably, the vehicle is a vehicle that includes a bed. The vehicle may be a truck, pickup truck, car with a bed, a four-wheel drive car with a bed, or a combination thereof. The bed may be a storage area of a car. The bed may carry cargo. The bed may be locked. The bed may include a tailgate at one end. The bed may have a front end proximate to a cab and a tailgate at an opposite end. The bed may store items. The tonneau system may function to close the bed, seal the bed, prevent fluid from entering the bed, lock the bed, prevent theft of items in the bed, or a combination thereof. The closed position may be where the tonneau system closed the bed. The stored position may be where all or a portion of the tonneau cover is located within the canister so that the bed is open, items can be removed from the bed, or both. The stored position may be where the tonneau sections are located within the canister and the tonneau cap is located out of the canister.

FIG. 1A illustrates a tonneau system 2 located within and covering a vehicle 150 bed 152. The cover system 2 includes a tonneau cover 3 that as shown is in the closed position 100.

Figure 1B:
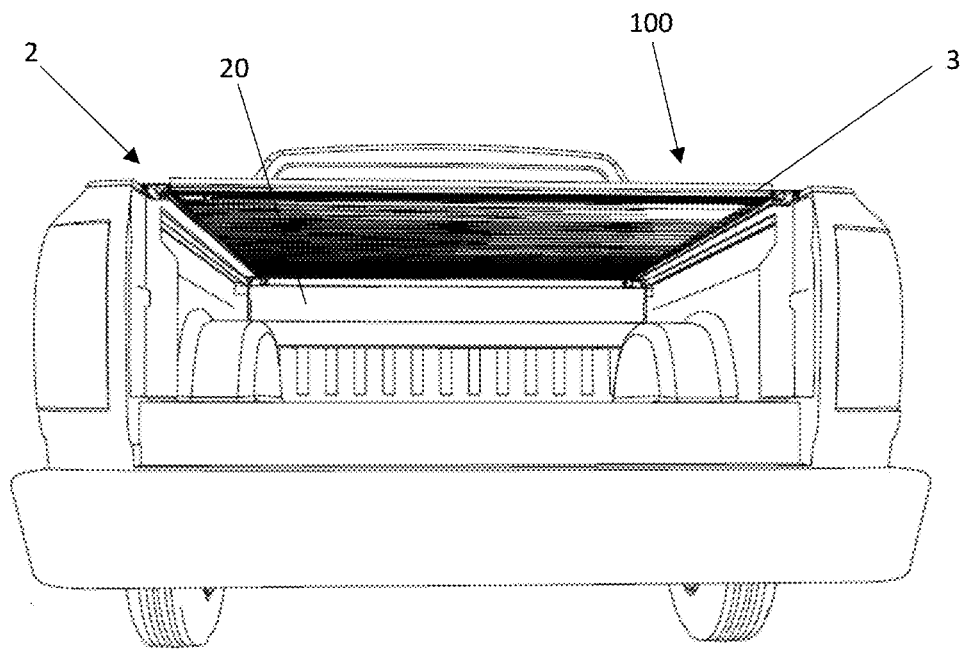
FIG. 1B is a rear perspective view of a vehicle with a tonneau system in a closed position.

FIG. 1B illustrates the tonneau system 2 with the tonneau cover 3 in the closed position 100. The tonneau cover 3 retracts into the canister 20 so that the canister 20 is exposed.

Figure 2A:
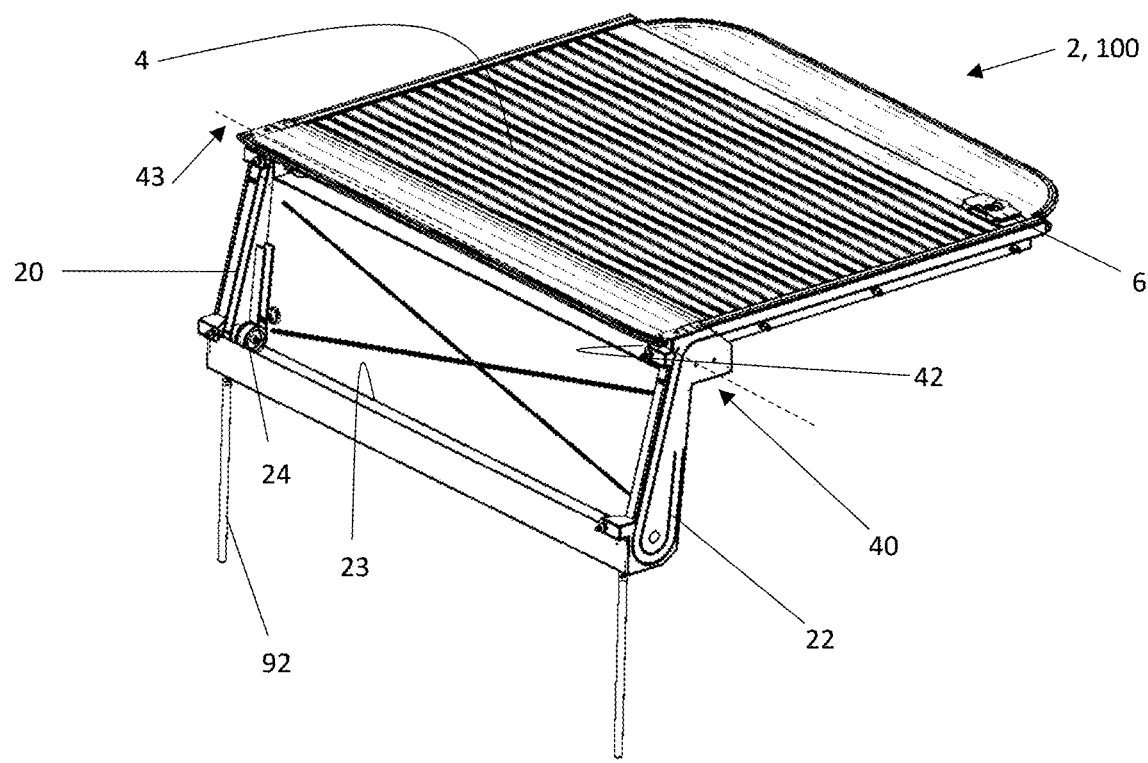
FIG. 2A is a front perspective view of a tonneau system in a closed position.

FIG. 2A is a perspective view of the tonneau system 2 in the closed position 100 and removed from the vehicle. The tonneau sections 4 include a lock mechanism 6 so that the tonneau system 2 can be locked in the closed position 100. The tonneau system 2 includes a plurality of tonneau sections 4 that are connected to a retraction system 40 that assist in moving the tonneau sections 4 into and/or out of the canister 20. The canister 20 includes a track 22 that guides the movement of the tonneau sections 4 and prevents the tonneau sections 4 from contacting each other. Drain tubes 92 extend from the canister 20 for diverting fluid out of the tonneau system 2. The retraction system 40 includes a drive roller 42 with a drive roller axis 43 and a pulley 24 with a pulley axis 23.

Figure 2B:
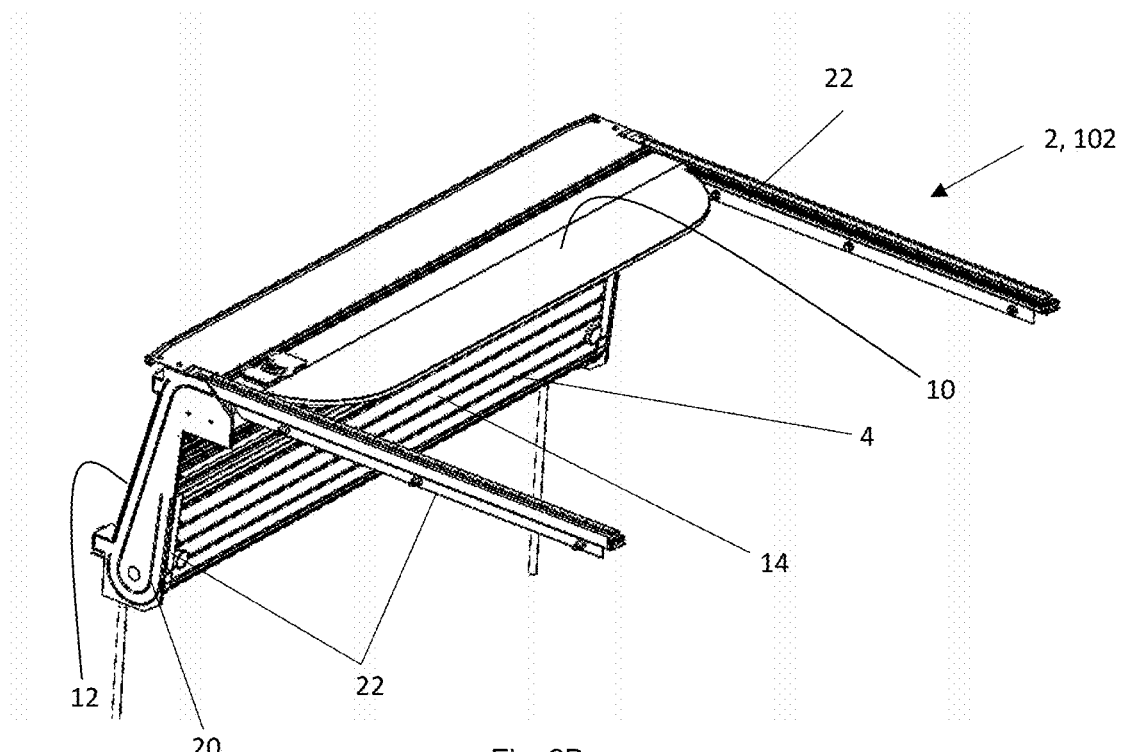
FIG. 2B is a rear perspective view of a tonneau system in a stored position.

FIG. 2B is a rear perspective view of a tonneau system 2 in the stored position 102. The tonneau system 2 includes a pair of tracks 22 that extend into a canister 20 where the tracks 22 wrap in an opposing direction. The tonneau sections 4 include an outer section 12 and an inner section 14. A tonneau cap 10 remains out of the canister 20 so that the tonneau sections 4 can be returned to the closed position.

Figure 2C:
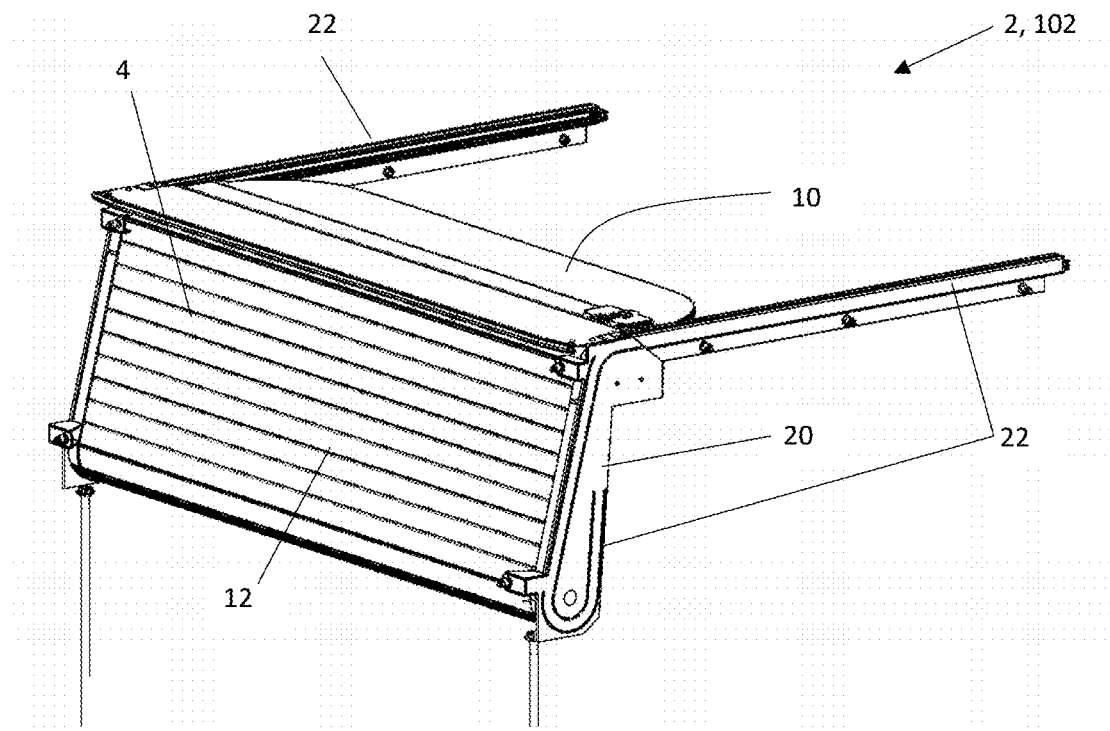
FIG. 2C is a front perspective view of a tonneau system in a stored position.

FIG. 2C is a front perspective view of a tonneau system 2 in the stored position 102. The tonneau system 2 includes a pair of tracks 22 that extend into a canister 20 and the tracks 22 wrap in an opposition direction so that the tonneau sections 4 have an outer section 12 and an inner section (not shown). The tonneau cap 10 remains outside of the canister 20 so that the tonneau cap 10 can assist in beginning closing of the tonneau system 2.

Figure 3:
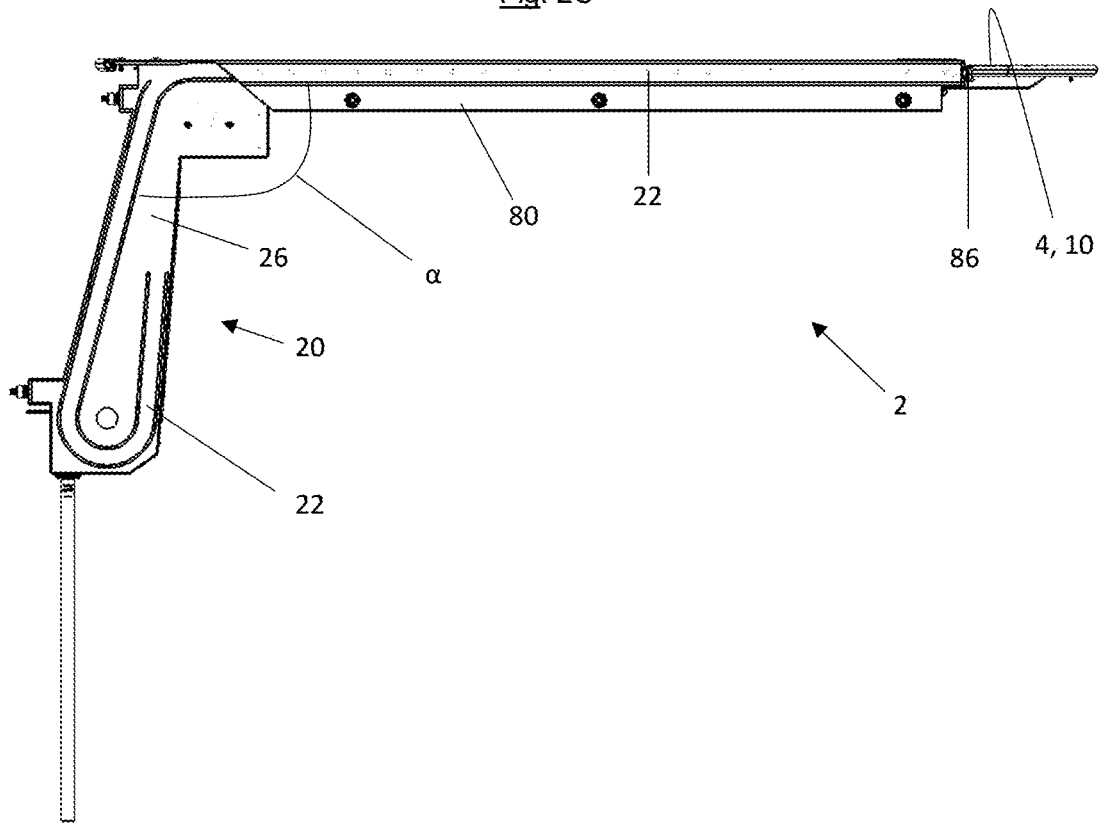
FIG. 3 is a side view of a tonneau system.

FIG. 3 is a side view of the tonneau system 2. A rail cap 80 extends a length of the bed (not shown) and creates a track 22 that the tonneau sections 4 move along until the tonneau sections contact a rail end cap 86 which prevents further movement. The rail cap 80 guides the tonneau sections 4 to the canister 20 and into the track 22. The tonneau cap 10 of the tonneau sections 4 extends a distance beyond the track 22 to complete locking of the tonneau system. A canister 20 includes a canister cover 26. An angle ($\alpha$) extends between the tonneau sections 4 and canister 20.

Figure 4A:
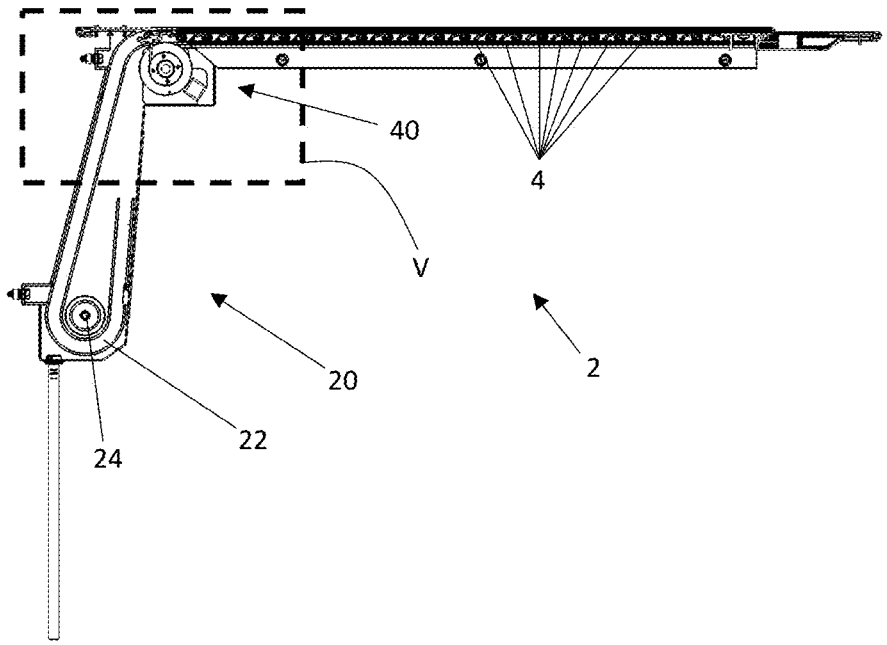
FIG. 4A is a side view of a tonneau system with a cover removed from a canister with a tonneau cover in a closed position.

FIG. 4A is a side view of the tonneau system 2 with the canister cover and rail cap removed so that the canister 20 and the retraction system 40 are exposed. The tonneau sections 4 are connected to the retraction system 40 that assists in moving the tonneau sections 4 into the canister 20. The canister includes a track 22 and pulley 24 with the pulley 24 being connected to a line (not shown) that extends from the tonneau sections 4 through the retraction system 40 and into contact with the pulley 24 within the canister 20.

Figure 4B:
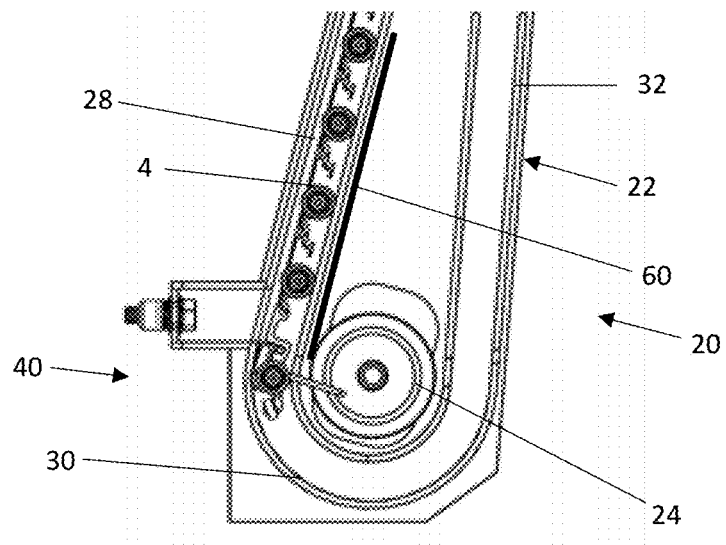
FIG. 4B is a close-up view of a cover extending into the canister.

FIG. 4B is a side view of the tonneau system 2 with the canister cover and rail cap removed so that the canister 20 and the retraction system 40 are exposed with the tonneau sections 4 being partially retracted or stored. The tonneau sections 4 are connected to the retraction system 40 that assists in moving the tonneau sections 4 into the canister 20. The canister includes a track 22 with multiple sections including an outer track 28, a curved track 30, and an inner track 32 forming a waterfall shape. A line 60 is connected to the tonneau sections 4 and the line 60 slows the tonneau sections 4 as the tonneau sections 4 approach the pulley 24

Figure 4C:
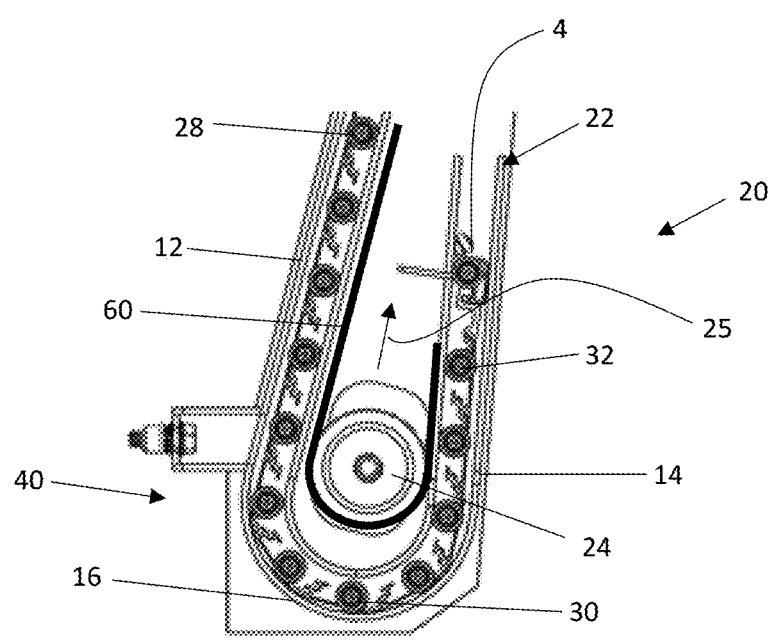
FIG. 4C is a close-up view of a cover extending around a curved section and into an inner section of the canister.

FIG. 4C is a side view of the tonneau system 2 with the canister cover (not shown) and rail cap (not shown) removed so that the canister 20 and the retraction system 40 are exposed with the tonneau sections 4 being almost fully retracted and stored. The tonneau sections 4 are connected to the retraction system 40 that assists in moving the tonneau sections 4 into the canister 20. The retraction system 40 includes a line 60 that wraps around the pulley 24 and moves the pulley 24 in the direction 25 as the tonneau sections 4 move along the inner section 14. The canister includes a track 22 with multiple sections including an outer track 28 that receives the outer section 12, a curved track 30 that receives a curved section 16, and an inner track 32 that receives an inner section 14 so that the track 22 and tonneau sections 4 form a waterfall shape.

Figure 4D:
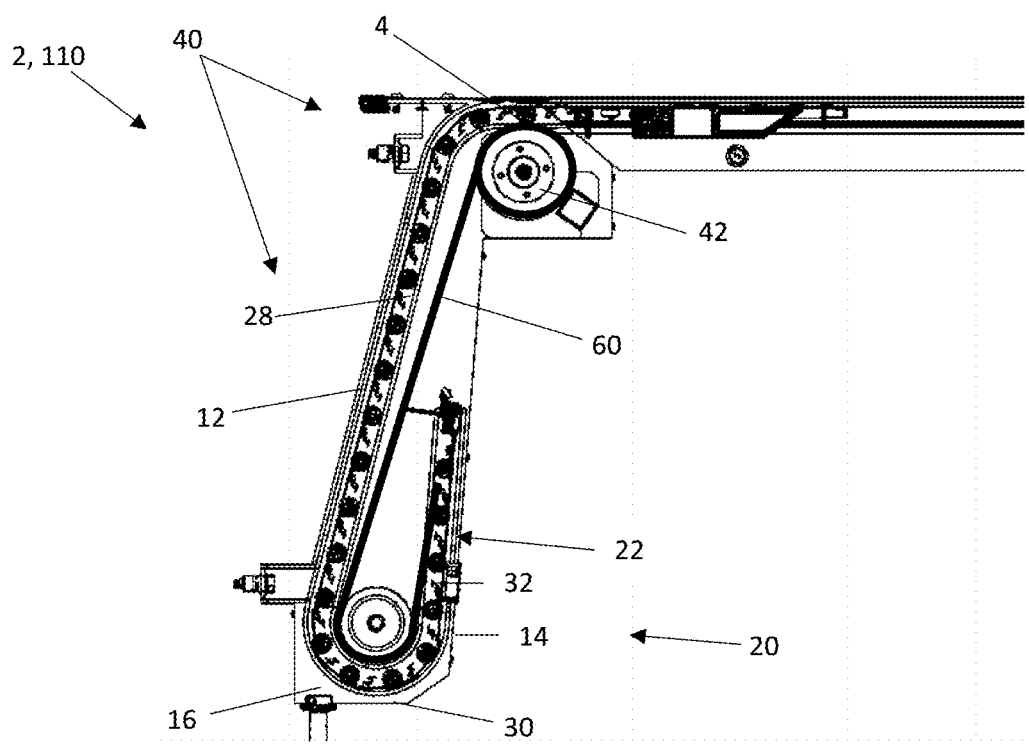
FIG. 4D is a side view of the tonneau cover in a stored position.

FIG. 4D is a side view of the tonneau system 2 with the canister cover and rail cap removed so that the canister 20 and the retraction system 40 are exposed with the tonneau sections 4 being fully stored. The tonneau sections 4 are connected to the retraction system 40 that assists in moving the tonneau sections 4 into the canister 20. The canister includes a track 22 with multiple sections including an outer track 28 that receives the outer section 12, a curved track 30 that receives a curved section 16, and an inner track 32 that receives an inner section 14 so that the track 22 and tonneau sections 4 form a waterfall shape. The inner section 12 extends to the end of the inner track 32. As shown, when the tonneau sections 4 are moved to the fully stored position 110 the line 60 is unwound from the drive roller 42 as the tonneau sections 4 moves around the drive roller 42, the line 60 then moves in a direction along the track 22, around the pulley 24, and then upward along the inner track 32.

Figure 5:
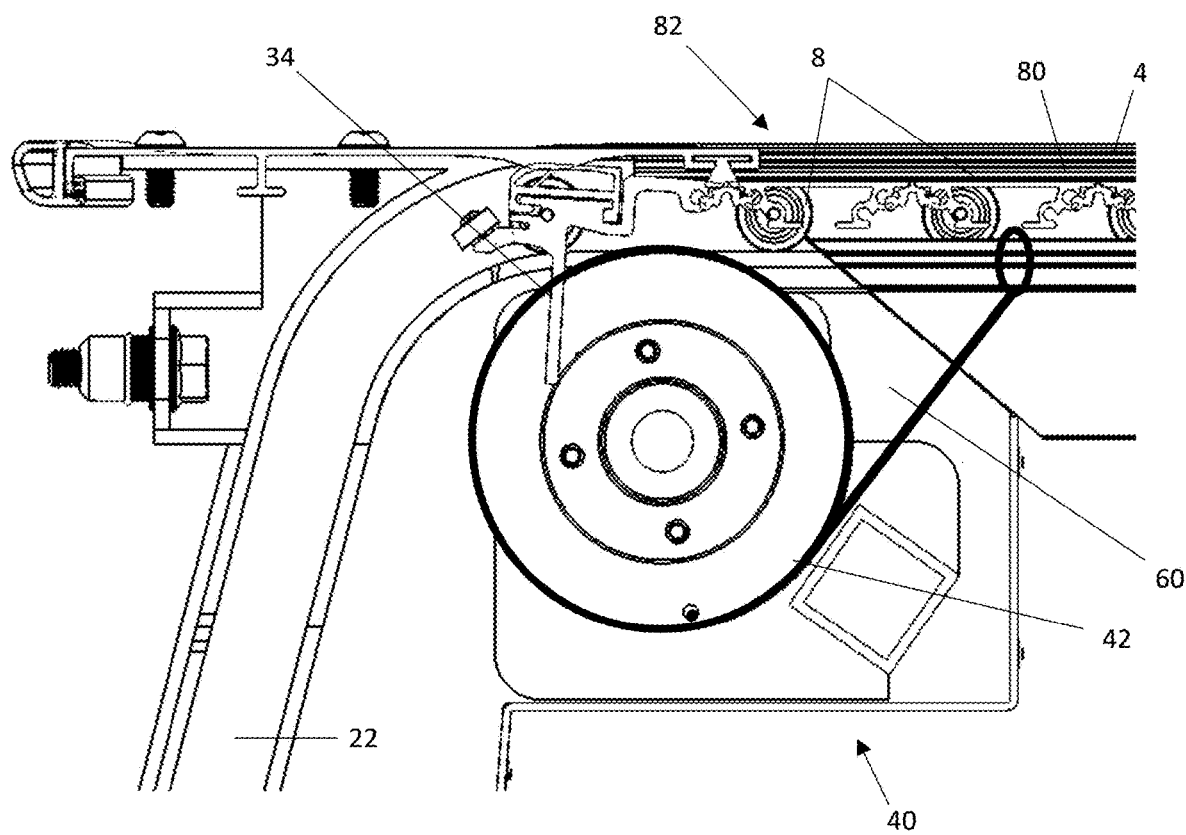
FIG. 5 is a close-up view of a connection between a drive roller and the tonneau sections via one or more lines.

FIG. 5 is a close-up view of the retraction system 40 of FIG. 4 in a fully closed position. The retraction system 40 includes a drive roller 42 that is in communication with a line 60 that connects to the tonneau sections 4 and the line 42 is wrapped around the drive roller 42. When the drive roller 42 rotates the line 60 unwinds and assists a user in moving the tonneau sections 4 along the roller track 82 in the roller cap 80. A leg 34 is connected to the tonneau sections 4 that provides cross bed stiffness and assists in waterproofing. As the tonneau sections 4 are retracted the rollers 8 of the tonneau sections 4 move into the track 22 so that the position of the tonneau sections 4 are controlled when the tonneau sections are moved to the stored position (not shown).

Figure 6:
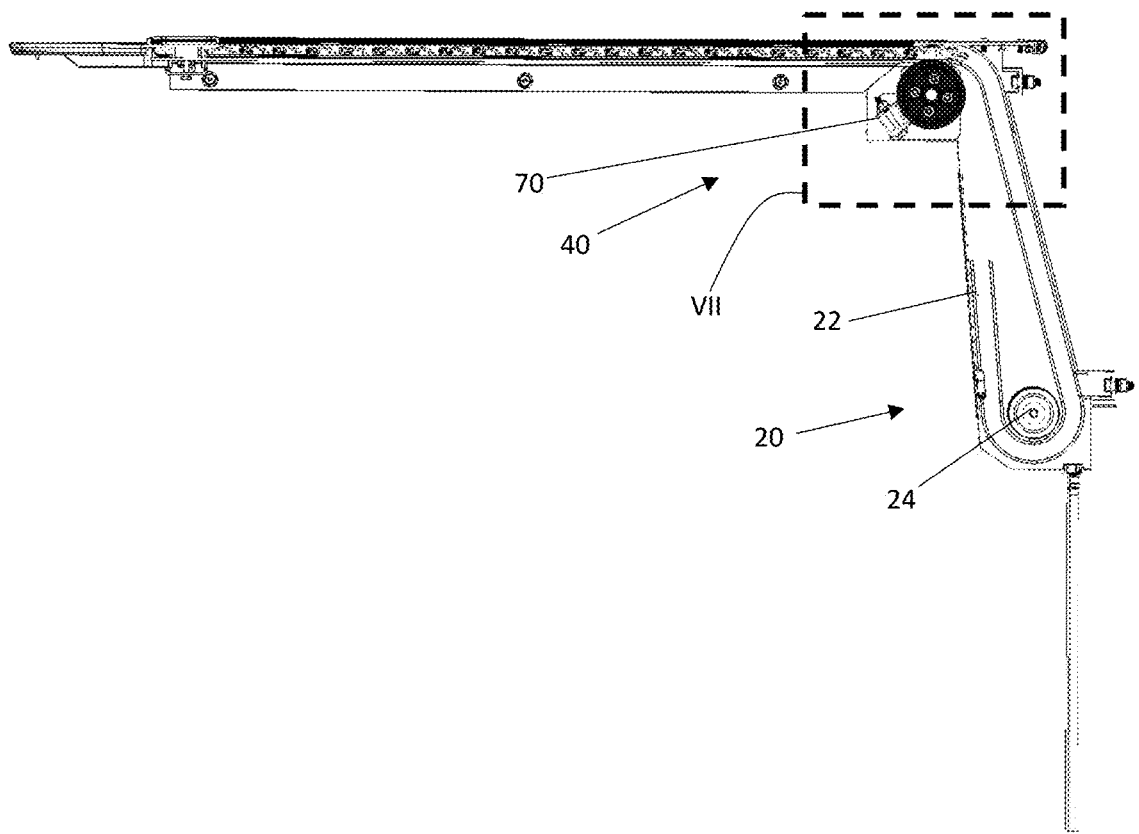
FIG. 6 is a view of a second side of the tonneau system with a cover removed from the canister and the tonneau cover in a closed position.

FIG. 6 is a side view of a second side of the tonneau system 2. The tonneau system includes a retraction system 40 that is connected to a vehicle (not shown) by connection parts 70. The connection parts 70 attach the track 22, canister 20, and pulley 24 to the vehicle.

FIG. 7 illustrates an outside of a canister 20. The canister 20 includes a canister cover 26 with an aperture 62 within the canister cover 26. A pulley shaft 64 extends from a pulley 24 through the aperture 62 and connects to a bias device 66 that connects to a pin 68, which grounds the bias device 66 on one side to the canister cover 26. The pulley shaft 64 includes a shaft flange 74 that movably connects the pulley shaft 64 to the aperture 62 of the canister cover 26. The pulley 24 is movable within the aperture 62 and the bias device 66 resists movement in a first direction and assists in retracting the pulley 24 in a second direction. Guides 72 are located on either side of the aperture 62 that assist in guiding the pulley 24 and pulley shaft 64 as the pulley 24 moves.

FIG. 8 an inside of the canister 20 where the pulley shaft 64 is shown extending through the aperture 62 in the canister cover 26 and being connected to the pulley 24. The pulley 24 is connected to a pulley plate 65 that assists the pulley 24 in maintaining its position relative to the canister 20 and prevents the pulley from being axially moved into the aperture 62.

FIG. 9 illustrates the pulley 24 in a first position and the pulley 24' in a second position. The pulley 24 is in the first position when the line 60 is in a first position and the pulley 24' is in a second position when the line 60' is in a second position.

Figure 10:
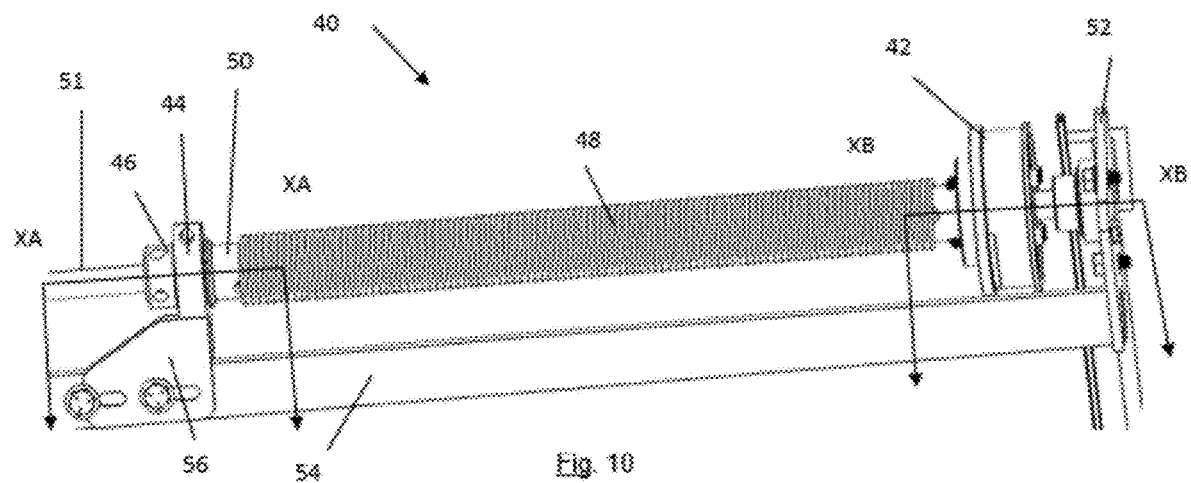
FIG. 10 is a perspective view of a retraction system.

FIG. 10 is a perspective view of a retractions system 40. The retraction system 40 is partially supported by a support arm 54 and support bracket 56 that connects to an adjuster 46 and clamp 44 that are in communication with an adjuster shaft 50. The adjuster 46 and clamp 44 allow the torque provided by a bias member 48 to be adjusted. The bias member 48 extends around the adjuster shaft 50 and is in communication with a driver roller 42. The adjuster shaft 50 is connected to an end plate 52 that supports a second end of the adjuster shaft 50. A shaft 51 extends through the adjuster 46, clamp 44, adjuster shaft 50, and bias member 48 to connect the retraction system on a first end (not shown) and a second end. The adjuster 44 is an end portion of the adjuster shaft 50.

Figure 10A:
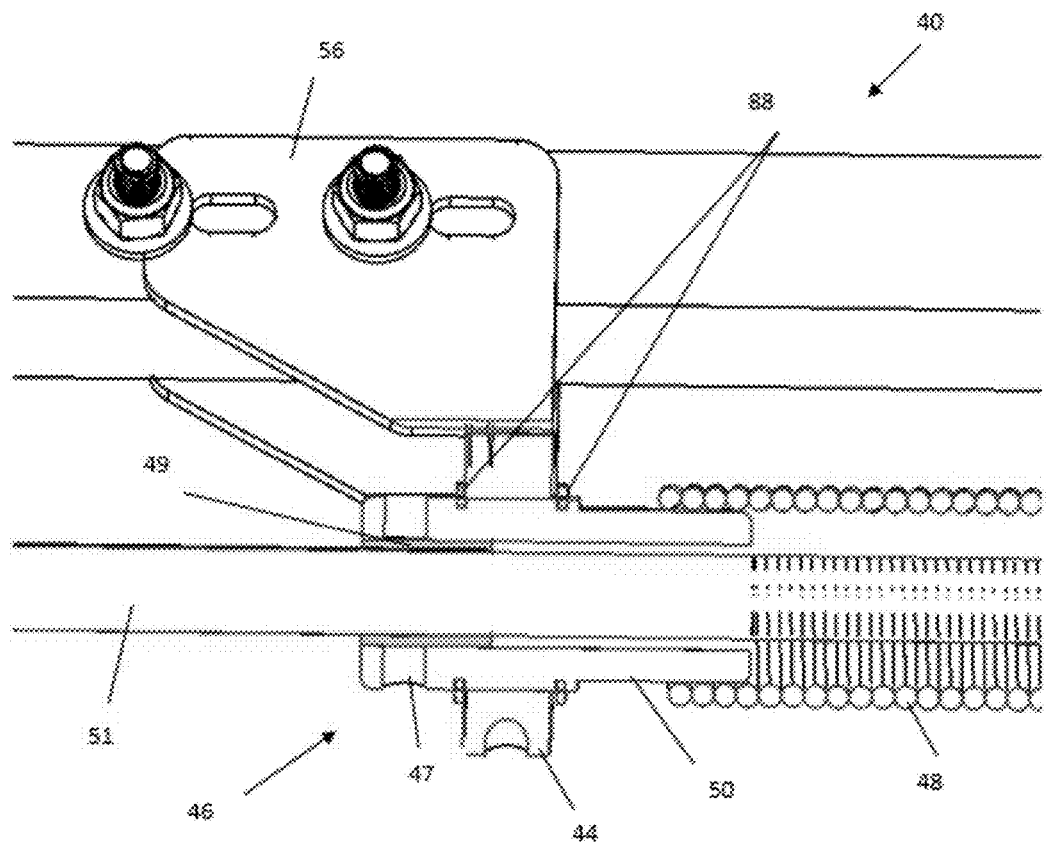
FIG. 10A is a cross-sectional view of an end of the retraction system of FIG. 10 along lines XA-XA.

FIG. 10A illustrates a cross-sectional view of an end of the retention system 40 of FIG. 10 along lines XA-XA. The retention system 40 includes a support bracket 56 that is connected to a clamp 44. The clamp 44 extends around and is connected to an adjuster 46. Fasteners 88 are located on both sides of the clamp 44 to prevent movement of the adjuster 46 relative to the clamp 44. The adjuster includes an adjuster shaft 50 that extends into the bias member 48 and is connected to the bias member 48. The adjuster 46 includes one or more adjuster apertures 47 that assist a user in rotating the adjuster shaft 49 about the adjuster sleeve 49 to increase or decrease tension of the bias member 48. The adjuster sleeve 49 is located between the shaft 51 and the adjuster shaft 50.

Figure 10B:
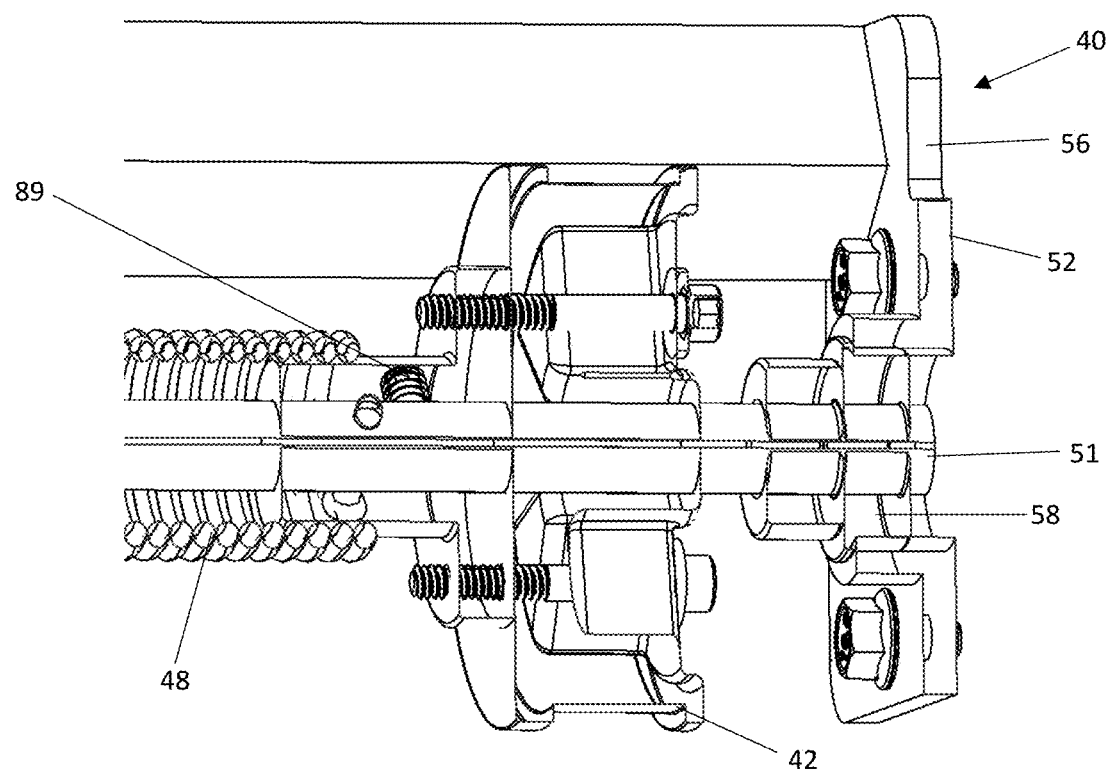
FIG. 10B is a cross-sectional view of an end of the retraction system of FIG. 10 along lines XB-XB.
Figure 11A:
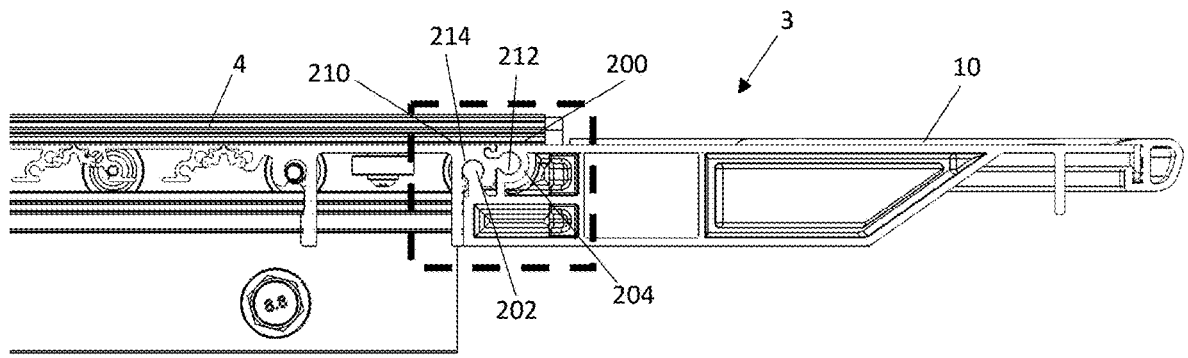
FIG. 11A is a side view of a connection between a tonneau cap and a tonneau section.

FIG. 10B illustrates a cross-sectional view of a second end of the retention system 40 of FIG. 10 along lines XB-XB. The retention system 40 includes an end plate 52, which is also a support bracket 56 that supports a bearing 58 that receives an end of the shaft 51. The shaft extends through the drive roller 42 which is in communication with the bias member 48. The bias member is connected to a drive roller shaft 41 that is connected to the shaft 51 by a retention fastener 89, FIG. 11A illustrates a tonneau cover 3 including a plurality of tonneau sections 4 and a tonneau cap 10. The tonneau cap 10 includes a tail connector 200 and the tonneau sections 4 include a latch bar connector 210. The tail connector 200 includes a male connector 202 and a female connector 204, and the latch bar connector 210 includes a male latch connector 212 and a female latch connector 214. The male connector 202 extends into the female latch connector 214 and the female connector 204 receives the male latch connector 212 so that the tonneau cap 10 is connected to the tonneau sections 4 and extends cantilever from the tonneau sections 4.

Figure 11B:
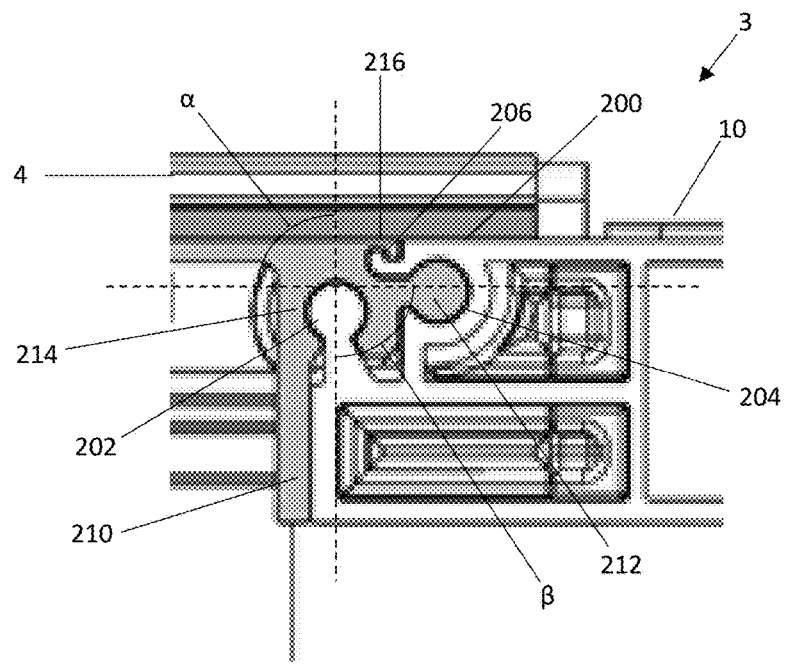
FIG. 11B is a close-up view of the connection between the tonneau cap and the tonneau section.

FIG. 11B illustrates a close-up view of the tail connector 200 connecting the tonneau cap 10 to one of the tonneau sections 4 via the latch bar connector 210 so that a tonneau cover 3 is formed. The tail connector 200 includes a male connector 202, a female connector 204 and a lock connector 206. The latch bar connector 210 includes a male latch connector 212 that extends into the female connector 204, a female latch connector 214 that receives the male connector 202, and a lock connector 206 that connects to the lock latch connector 216. The male connector 202 and the female connector 204 of the tail connector 200 extend at an angle (α) relative to each other, and the male latch connector 212 and the female latch connector 214 extend at and (β) relative to each other.

Figure 12:
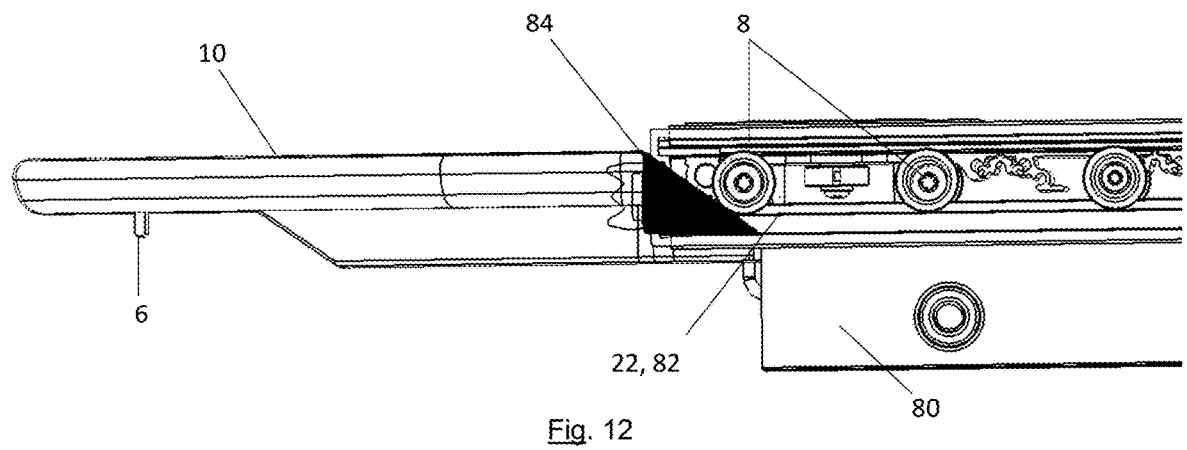
FIG. 12 is a side view of a tonneau cover including a tail support.

FIG. 12 illustrates a tail support 84 that contacts a last roller 8 when the tonneau cap 10 extends cantilever out of the rail cap 80 and roller track 82. The tail support 84 supports the last roller 8 within the track 22 so that the rail cap 80 does not sag as the rail cap extends to a location where the lock mechanism 6 contacts a portion of a bed of a vehicle (not shown). As shown the tail support 84 is a wedge, however, the tail support 84 may be a step.

Figure 13:
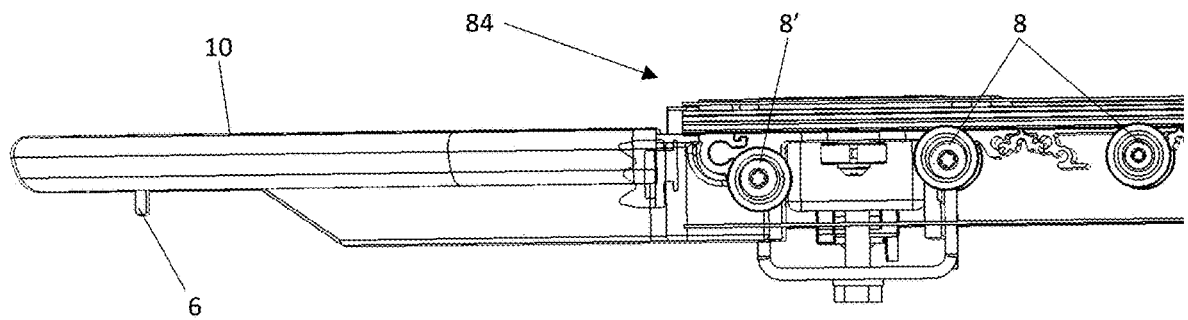
FIG. 13 is a side view of a tonneau cover including a tail support.

FIG. 13 illustrates a tail support 84 that is an offset roller 8' that extends out of the plane of the other rollers 8. The offset roller 8' contacts the track (not shown) and supports the tonneau cap 10 as the tonneau cap 10 extends cantilever from the roller track 82 so that the lock mechanism 6 can connect with a bed of a vehicle (not shown). The offset roller 8' assists in lifting the tonneau cap 10 so that the tonneau cap 10 is free of sag.

Figure 14:
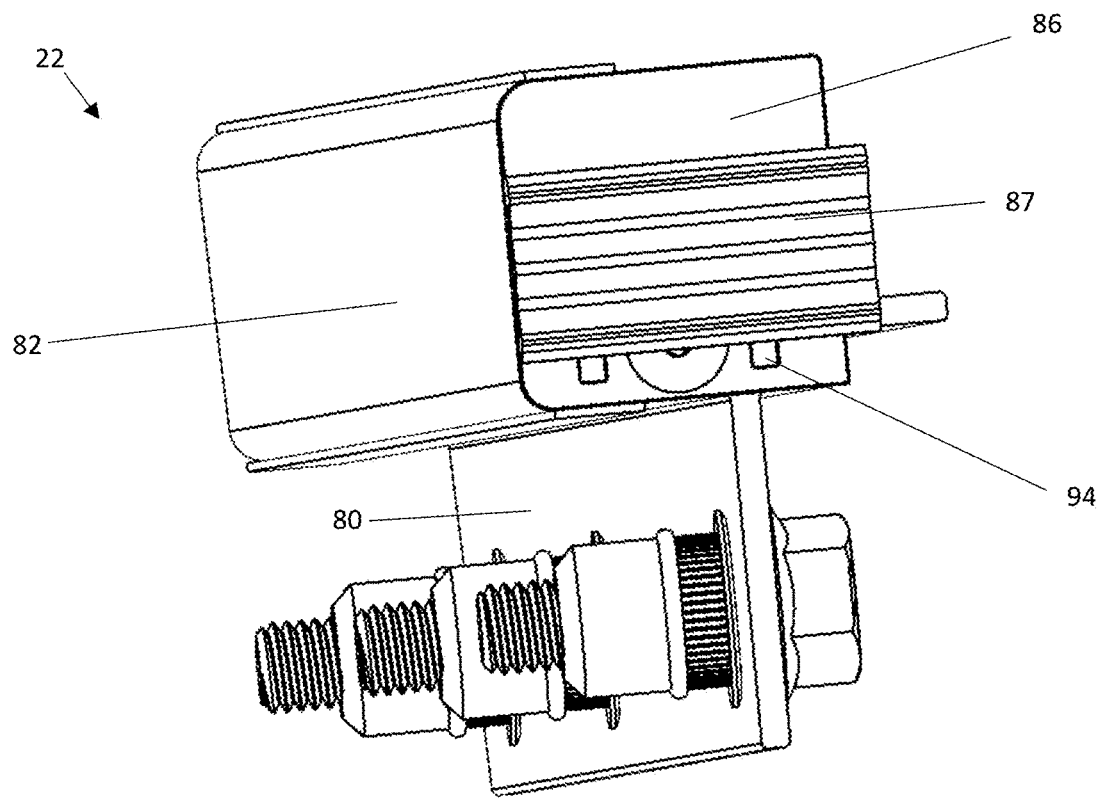
FIG. 14 is a close-up perspective view of a track.

FIG. 14 illustrates a perspective view of a track 22 with roller cap 80 connected to a roller track 82. The roller track 82 includes a rail end cap 86 at an end. The end rail cap 86 includes drain holes 94 that allow fluid to exit the roller track 82, and the end rail cap 86 includes a bumper 87.

Figure 15:
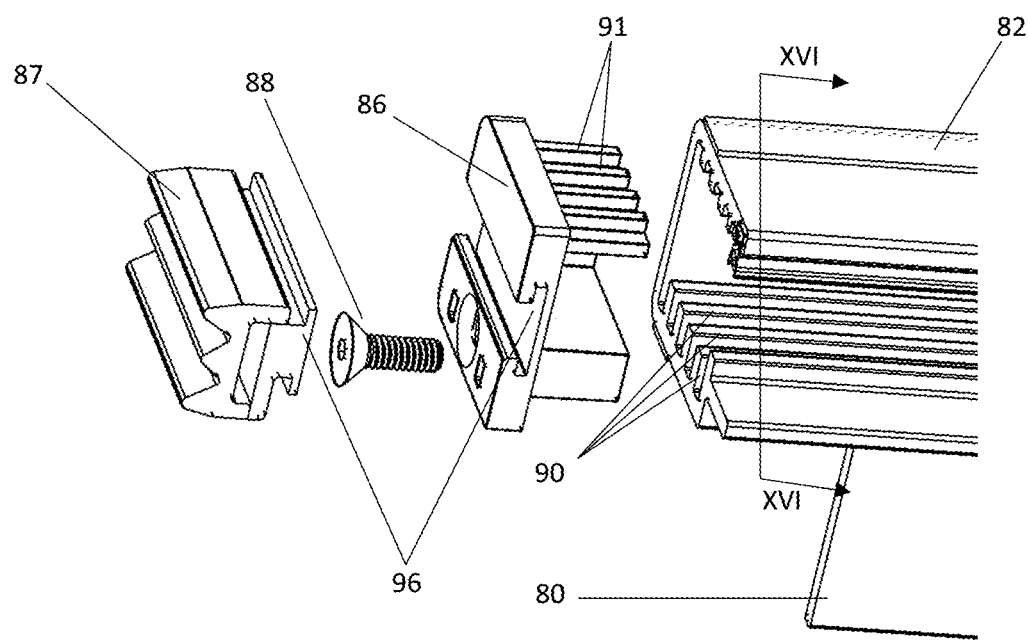
FIG. 15 is an exploded view of a track and rail end cover.

FIG. 15 illustrates an exploded view of the rail end cap 86 extending away from roller track 82. The rail end cap 86 is connected via a fastener 88. The roller track 82 includes a plurality of drain channels 90, and the roller track 82 is connected to a rail cap 80 that includes drain plugs 91 that extend into the drain channels 90. The rail end cap 86 includes a connection feature 96 that receives a connection feature of a bumper 87 so that the bumper 87 is connect to and extends from the rail end cap 86. The fastener 88 extends into one of the drain channels 90 to connect the rail end cap 86 to the roller track 82.

Figure 16:
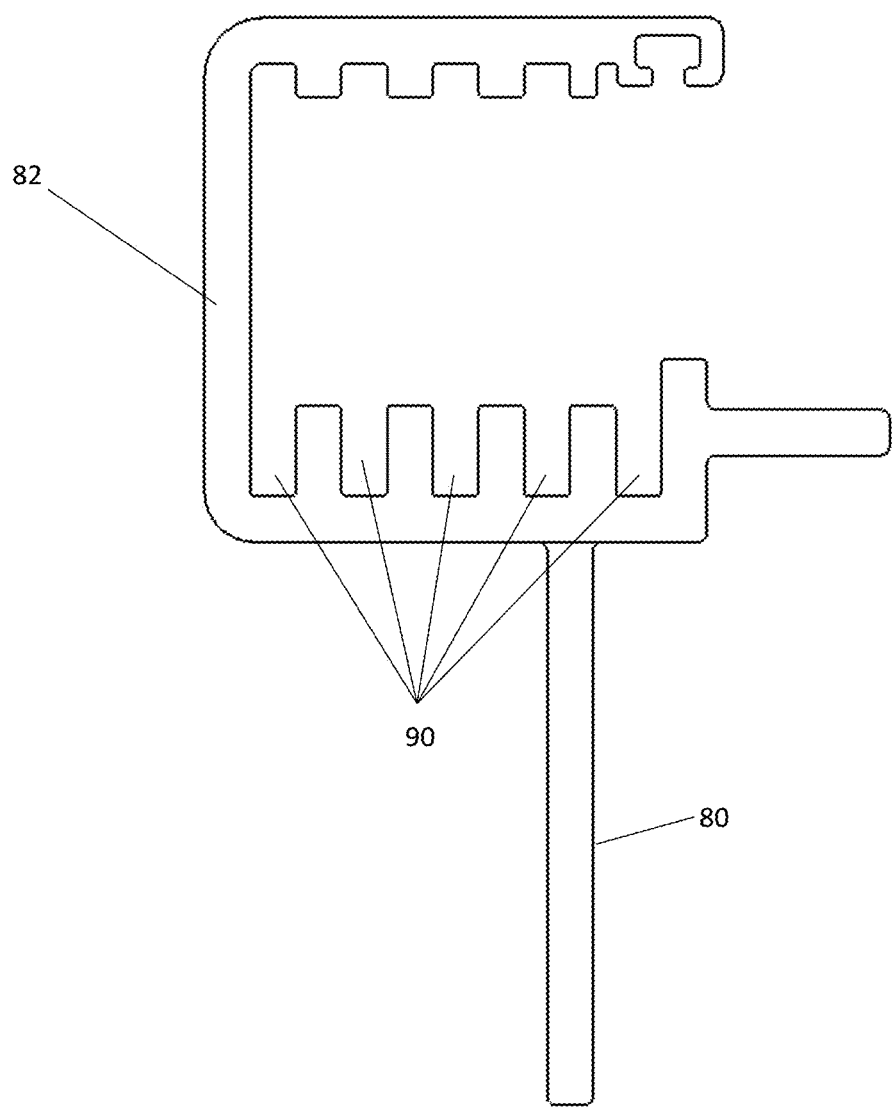
FIG. 16 is an end view of a roller track.

FIG. 16 is a cross-sectional view of the roller track 82 and rail cap 80 along lines XVI-XVI of FIG. 15 so that the drain channels 90 are visible.

Figure 17:
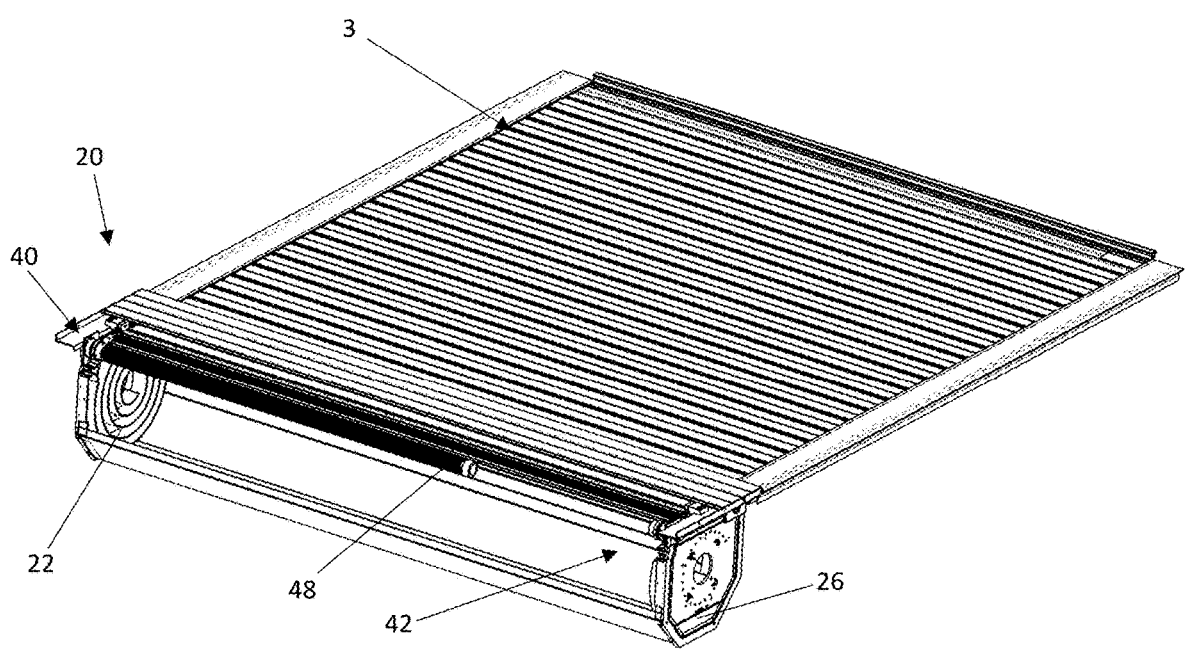
FIG. 17 is a perspective view of the tonneau system including a retraction system.

FIG. 17 is a partial perspective view of the tonneau system 2. The tonneau cover 3 is extended and connected to the canister 20. The tonneau cover 3 includes a plurality of tonneau sections 4 that are connected together by a plurality of hinges 17 each including a hinge axis 18. The canister 20 includes a track 22 having a plurality of tracks 22 (track one 22A, track two 22B, and track three 22C) and a retraction system 40. The retraction system 40 includes a drive roller 42 that is connected to a line 60. The tonneau cover 3 extends along a first plane 7 and a line 60 extends along a second plane 76 and connects to the tonneau cover 3. The first plane 7 and the second plane 76 are substantially parallel. When the drive roller 42 rotates, the line 60 is moved towards a front of the bed (not shown) and the tonneau cover 3 is moved into the track 22. The line 60 extends along a guide 72, through a line rail grommet 61, and under an under body rail 14 so that the line 60 is concealed from view.

Figure 18:
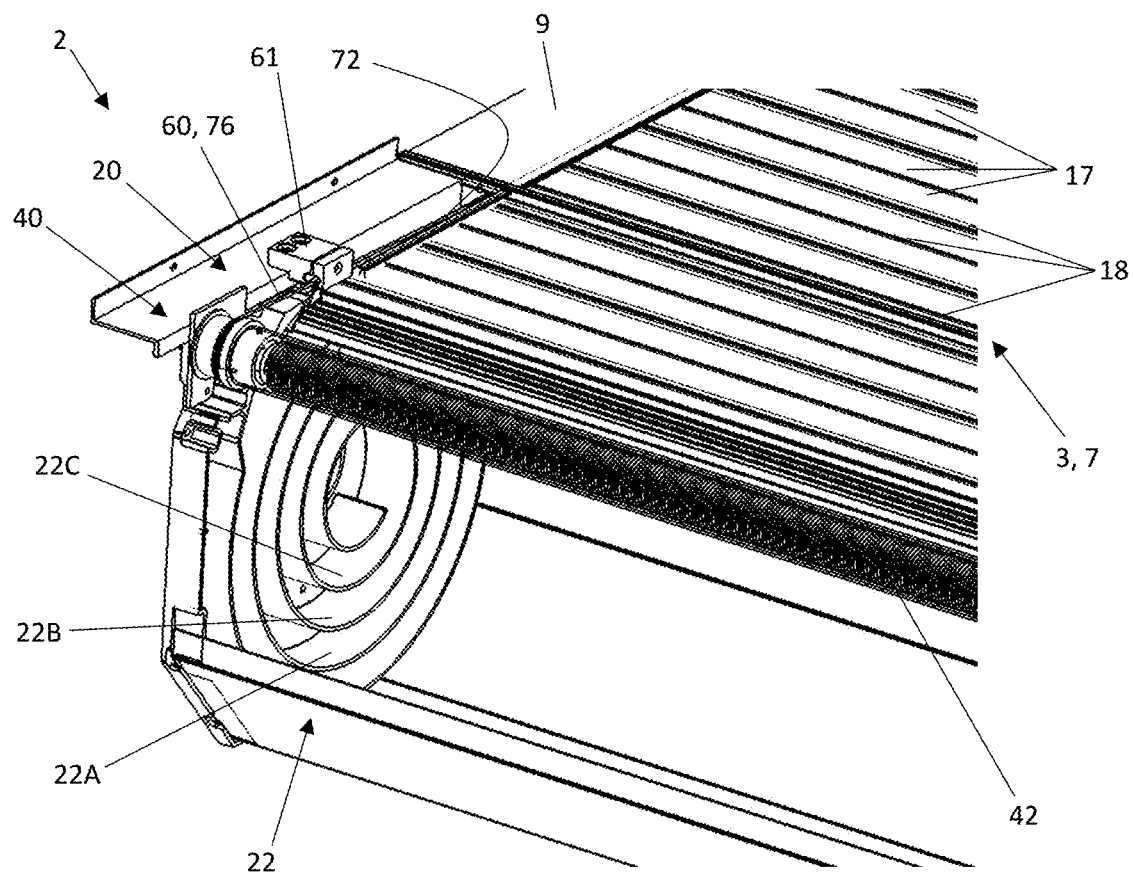
FIG. 18 is a close-up partial perspective view of the retraction system and the canister of FIG. 17.

FIG. 18 illustrates a tonneau cover 3 that extends from the canister 20. The canister 20 includes a canister cover 26, a track 22, and a retraction system 40 including a roller 42 with a bias member 48 located within the roller 42.

Figure 19:
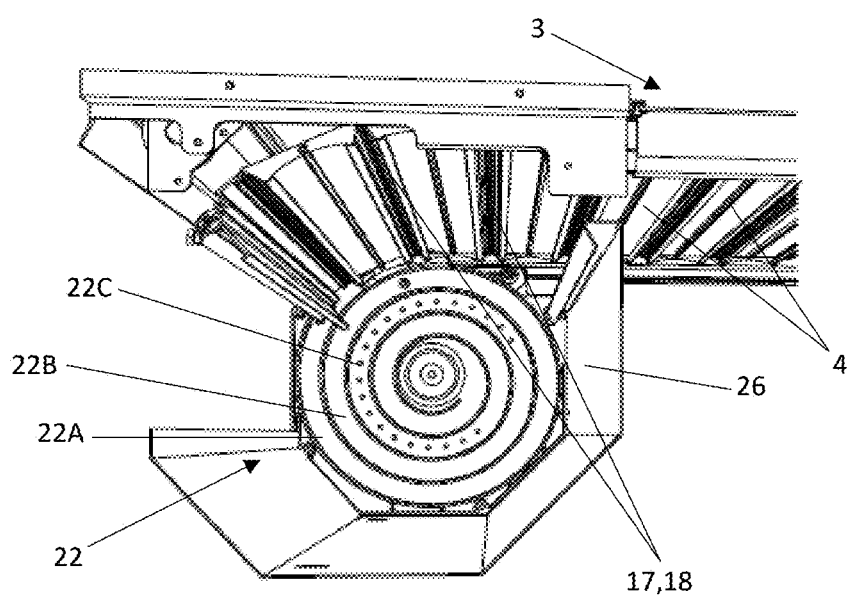
FIG. 19 is an end view of canister including the track and tonneau cover.

FIG. 19 is a side view of a track 22 with a plurality of tracks 22 (track one 22A, track two 22B, and track three 22C). The tonneau cover 3 includes a plurality of tonneau sections 4 connected together by hinges 16 along a hinge axis 18 so that the tonneau cover 3 can extend into the plurality of tracks 22 that are connected to the canister cover 26.

Figure 20:
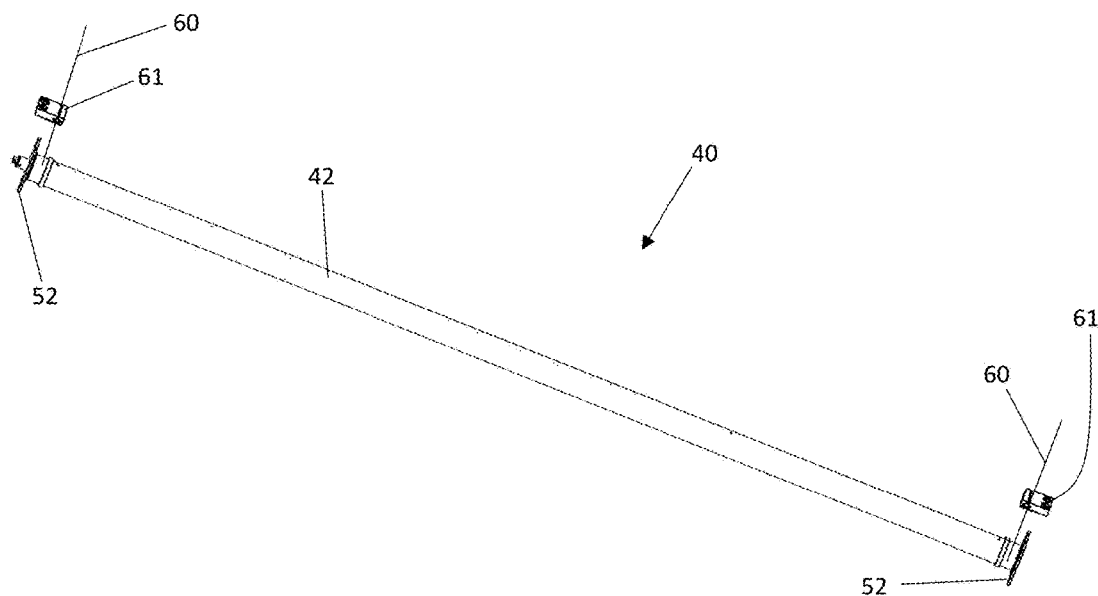
FIG. 20 is a perspective view of a retraction system.

FIG. 20 is a perspective view of a retraction system 40. The retraction system 40 includes a roller 42 that extends between and connects to end plates 52. A line 60 extends from each end of the roller 42 and the lines 60 extend through a line rail grommet 61 that assists in guiding the lines 44.

Figure 21:
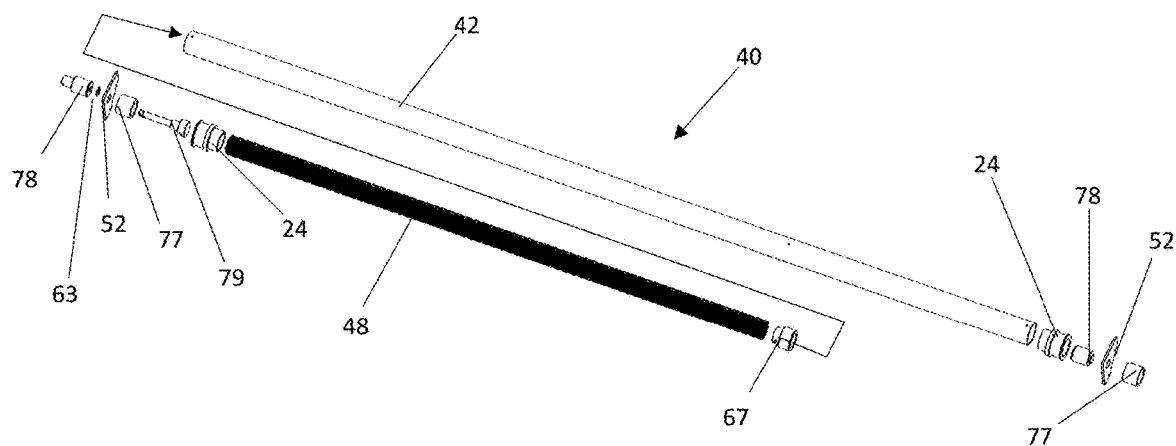
FIG. 21 is an exploded view of the retraction system.

FIG. 21 is an exploded perspective view of a retraction system 40. A first end of a roller 42 includes a bearing 77, end plate 52, bearing carrier 56, and pulley 24. A bias member 48 extends into the roller 42 and the bias member 48 includes a bias member end plate 67 at a first end. A second end of the bias member 48 ends at the second end of the roller 42 and the second end includes a pulley 24, a tensioner 79, a bearing 77, an end plate 52, a bearing carrier 78, and a retaining ring 63.

Figure 22:
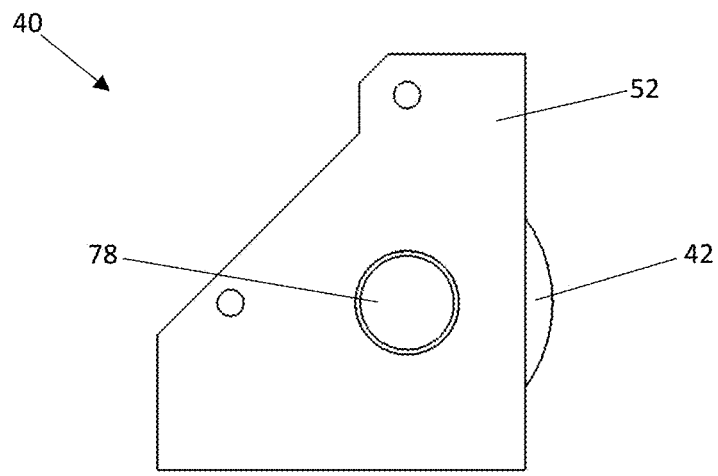
FIG. 22 is an end view of the retraction system and end plate.

FIG. 22 includes a side view of a first end of the retraction system 40. The first end includes an end plate 52 connected to a bearing carrier 78 at an end of the drive roller 42.

Figure 23:
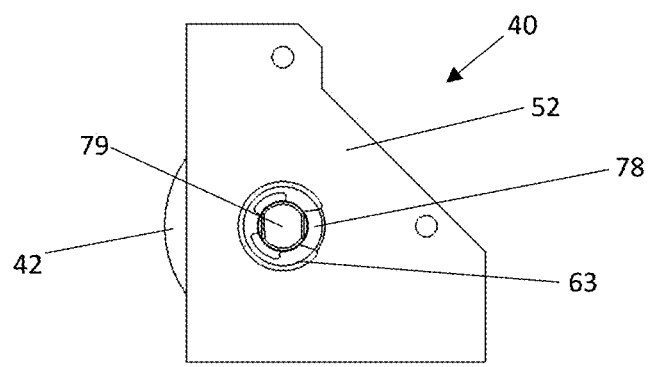
FIG. 23 is an end view of the retraction system and an opposite end plate of FIG. 22.

FIG. 23 illustrates a side view of a second end of the retraction system 40. The second end includes an end plate 52 connected to a bearing carrier 78 that receives a portion of the tensioner 79. A retaining ring 63 locks the roller 42 to the end plate 52.

Figure 24:
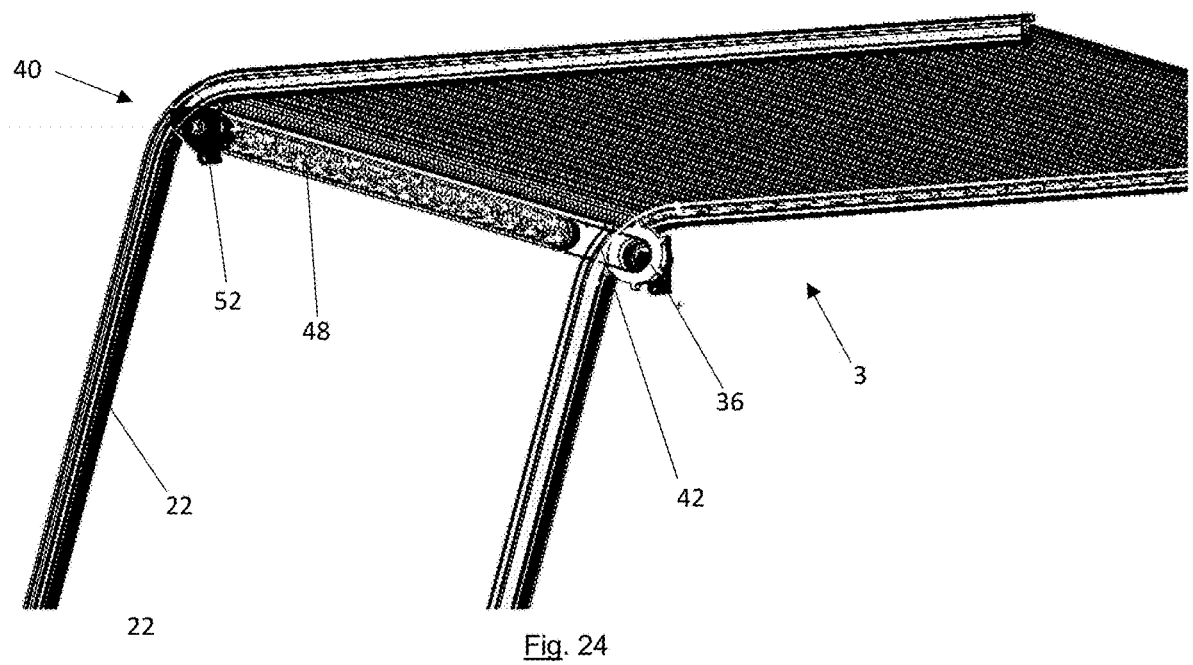
FIG. 24 is a bottom perspective view of a tonneau system and tonneau cover in a closed position.

FIG. 24 is a bottom perspective view of a tonneau cover 3 that is movable along tracks 22 by a retraction system 40. The retraction system 40 includes a drive roller 42 supported between end plates 52. A bias member 48 is located within the drive roller 42 and the bias member biases the drive gears 36 to assist in moving the tonneau cover 3.

Figure 25:
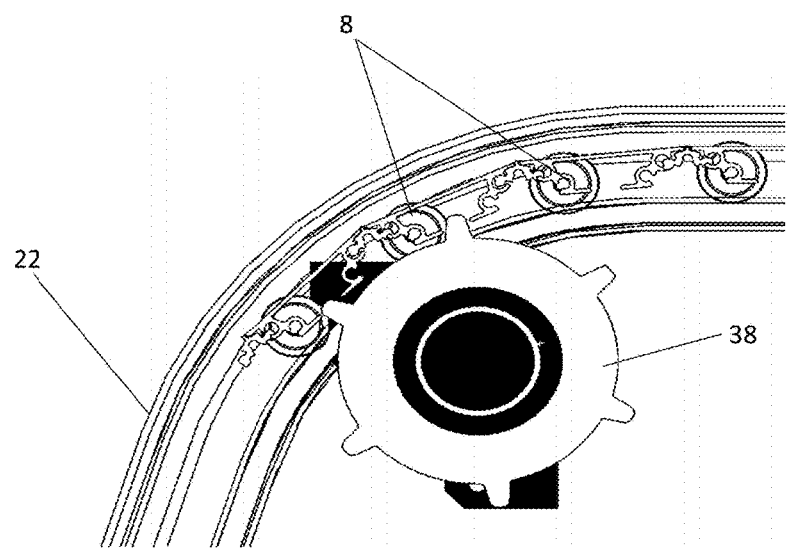
FIG. 25 is a close-up view of a drive gear.

FIG. 25 is a close-up view of a drive gear 38 connected to a drive roller shaft 41. The drive gear 38 includes a body 28 and teeth 37. The teeth are in communication with rollers 8 to move the tonneau cover (not shown) along the track 22.

Figure 26:
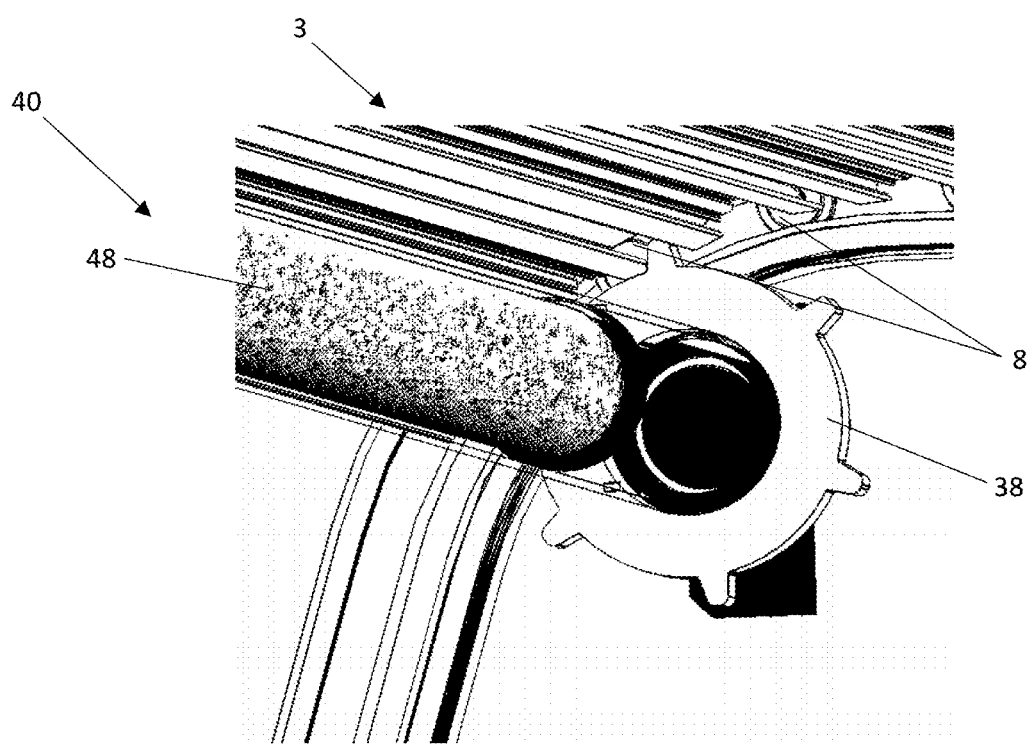
FIG. 26 is a close-up perspective view of a retraction system including a drive gear.

FIG. 26 is a perspective view of a portion of the retraction system 40 showing the drive gear 38 in communication with the rollers 8 of the tonneau cover 3. A bias member 48 assists in moving the drive gear 38.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Tonneau System
3 Tonneau cover
4 Tonneau Section
5 Guide
6 Lock mechanism
7 First Plane
8 Rollers
8' Offset roller
9 Underbody Rails
10 Tonneau Cap
12 Outer Section
14 Inner Section
16 Curved section
17 Hinge
18 Hinge Axis
20 Canister
22 Track
22A Track One
22B Track Two
22C Track Three
23 Pulley axis
24 Pulley
25 Direction of movement
26 Canister cover
28 Outer Track
30 Curved track
32 Inner track
34 Leg
36 Drive Gear
37 Teeth
38 Body
40 Retraction system
41 Drive Roller shaft
42 Drive roller
43 Drive roller axis 44 Clamp
46 Adjuster
47 Adjuster aperture
48 Bias member
49 Adjuster sleeve
50 Adjuster shaft
51 Shaft
52 End plate
54 Support arm
56 Support bracket
58 Bearing
60 Line
61 Line Rail Grommet
62 Aperture
63 Retaining Ring
64 Pulley Shaft
65 Pulley plate
66 Bias device
67 Bias Member End Plate
68 Pin
70 Mounting part
72 Guides
74 Shaft flange
76 Second Plane
77 Bearing
78 Bearing Carrier
79 Tensioner
80 Rail cap
82 Roller track
84 Tail support (wedge)
86 Rail end cap
87 Bumper
88 Fastener
89 Retention Fastener
90 Drain channels
91 Drain plug
92 Drain Tubes
94 Drain hole
96 Connection feature
100 Closed position
110 Stored position
150 Vehicle
152 Bed
200 Tail connector
202 Male connector
204 Female connector
206 Lock connector
210 Latch bar connector
212 Male latch connector
214 Female latch connector
216 Lock latch connector

What is claimed is:

1. A tonneau system comprising:
a. a plurality of tonneau sections;
b. a retraction system including:
  i. a drive roller;
  ii. a pulley spaced apart from the drive roller,
  iii. a track extending from a location proximate to the drive roller to a location proximate to the pulley; and
  iv. a line connected to the drive roller and one or more of the plurality of tonneau sections;
wherein the line extends between the one or more of the plurality of tonneau sections and the drive roller when the plurality of tonneau sections are in a closed position, and the line extends from the one or more of the plurality of tonneau sections around the pulley and to the drive roller when the plurality of tonneau sections are in a stored position.

2. The tonneau system of claim 1, wherein the drive roller rotates around a drive roller axis but is movably static relative to the drive roller axis.

3. The tonneau system of claim 1, wherein the pulley rotates about a pulley axis and when the pulley moves, the pulley has a directional component in a direction towards the drive roller as the line wraps around the pulley and the plurality of tonneau sections move towards the stored position.

4. The tonneau system of claim 3, wherein the pulley is connected to a pulley shaft that extends along the pulley axis.

5. The tonneau system of claim 4, wherein the pulley shaft is connected to one or more bias devices that restricts movement of the pulley as the plurality of tonneau sections move towards the stored position and the one or more bias devices assist in returning the pulley to a starting position as the plurality of tonneau sections move towards the closed position.

6. The tonneau system of claim 5, wherein the retraction system includes a pin and the one or more bias devices extend between the pin and the pulley shaft, and the one or more bias devices extends with the pulley shaft as the pulley moves towards the drive roller and the pin remains static so that the one or more bias devices extend between the pulley shaft and the pin.

7. The tonneau system of claim 1, wherein the pulley includes one or more guides that assist in guiding the pulley towards or away from the drive roller along a predetermined path.

8. The tonneau system of claim 1, wherein the track includes an outer track, an inner track that extends parallel to or almost parallel to the outer track, and a curved track that connects the outer track and the inner track.

9. The tonneau system of claim 8, wherein the plurality of tonneau sections extend along the outer track as the plurality of tonneau sections move from the closed position to the stored position, then the plurality of tonneau sections extend around the curved track, and into the inner track where the plurality of tonneau sections stop.

10. The tonneau system of claim 1, wherein the retraction system is housed within a canister.

11. The tonneau system of claim 10, wherein the canister includes one or more canister covers.

12. The tonneau system of claim 11, wherein the one or more canister covers include one or more apertures and one or more guides, and one or more pulley shafts extend through the one or more apertures.

13. The tonneau system of claim 12, wherein the one or more pulley shafts are connected to the pulley and the one or more pulley shafts connect to a bias device on an opposing side of the one or more canister covers.

14. The tonneau system of claim 13, wherein a pin is connected to the one or more canister covers and the pin is grounded to the one or more canister covers so that as the bias device is biased the pin assists the bias device in storing energy so that the bias device assists in retracting the pulley.

15. The tonneau system of claim 1, wherein the pulley creates a resistive force as the plurality of tonneau sections move from the closed position to the stored position and creates an assist force as the plurality of tonneau sections move from the stored position to the closed position.

* * * * *